US009720835B1

(12) United States Patent
Shilane et al.

(10) Patent No.: US 9,720,835 B1
(45) Date of Patent: *Aug. 1, 2017

(54) METHODS TO EFFICIENTLY IMPLEMENT COARSE GRANULARITY CACHE EVICTION BASED ON SEGMENT DELETION HINTS

(71) Applicant: EMC IP Holding Company LLC, Hopkinton, MA (US)

(72) Inventors: Philip Shilane, Yardley, PA (US); Grant Wallace, Pennington, NJ (US); Frederick Douglis, Basking Ridge, NJ (US); Cheng Li, Highland Park, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/609,839

(22) Filed: Jan. 30, 2015

(51) Int. Cl.
*G06F 12/08* (2016.01)
*G06F 12/12* (2016.01)
(Continued)

(52) U.S. Cl.
CPC ........ *G06F 12/0833* (2013.01); *G06F 12/121* (2013.01); *G06F 12/126* (2013.01); *G06F 2212/62* (2013.01); *G06F 2212/69* (2013.01)

(58) Field of Classification Search
CPC .... G06F 12/0804; G06F 12/12; G06F 12/121; G06F 12/122; G06F 12/123;
(Continued)

(56) References Cited

U.S. PATENT DOCUMENTS 8,935,446 B1 1/2015 Shilane et al.
9,189,402 B1 11/2015 Smaldone et al.
(Continued)

OTHER PUBLICATIONS

Keramidas et al, "Cache Replacement Based on Reuse-Distance Prediction," 25th International Conference on Computer Design, 2007 (ICCD 2007), Oct. 7-10, 2007, pp. 245-250.*
(Continued)

*Primary Examiner* — Tuan Thai
*Assistant Examiner* — Glenn Gossage
(74) *Attorney, Agent, or Firm* — Blakely, Sokoloff, Taylor & Zafman LLP

(57) ABSTRACT

A data processing system and methods for performing cache eviction are disclosed. An exemplary method includes maintaining a metadata set for each cache unit of a cache device, wherein the cache device comprises a plurality of cache units, each cache unit having a plurality of segments, wherein each metadata set includes deletion hints (DH) metadata indicating whether the plurality of segments of a corresponding cache unit are valid. The exemplary method further includes in response to determining that a cache eviction is to be performed, selecting a predetermined number of cache units from the plurality of cache units, and determining a score for each of the selected cache units based on the DH metadata of the respective metadata set. The DH metadata may include, for example, a validation count for each segment group or cache unit. A deprecated segment can be changed back to being valid, and the score for each of the selected cache units may further be determined based on a determined probability.

33 Claims, 15 Drawing Sheets

(51) Int. Cl.
*G06F 12/0831* (2016.01)
*G06F 12/126* (2016.01)
*G06F 12/121* (2016.01)

(58) Field of Classification Search
CPC ........... G06F 12/126; G06F 2212/1021; G06F 2212/2022; G06F 2212/202; G06F 2212/214; G06F 2212/7205; G06F 2212/7207; G06F 12/0833; G06F 2212/62
See application file for complete search history.

(56) References Cited

U.S. PATENT DOCUMENTS

| | | | |
|---|---|---|---|
| 9,336,143 B1 | 5/2016 | Wallace et al. | |
| 9,389,965 B1* | 7/2016 | Douglis | G06F 12/0269 |
| 9,390,116 B1 | 7/2016 | Li et al. | |
| 2003/0126369 A1* | 7/2003 | Creta | G06F 12/0804 711/133 |
| 2011/0066808 A1* | 3/2011 | Flynn | G06F 12/0246 711/118 |
| 2012/0198175 A1 | 8/2012 | Atkisson | |
| 2013/0346672 A1 | 12/2013 | Sengupta et al. | |
| 2014/0047190 A1* | 2/2014 | Dawkins | G06F 12/0813 711/136 |
| 2014/0095775 A1* | 4/2014 | Talagala | G06F 12/0866 711/103 |
| 2014/0129779 A1* | 5/2014 | Frachtenberg | G06F 12/123 711/136 |
| 2014/0181432 A1* | 6/2014 | Horn | G06F 12/0253 711/159 |
| 2015/0039805 A1* | 2/2015 | Backhausen | G06F 12/0246 711/103 |

OTHER PUBLICATIONS

Bhagwan, et al., "Time-varying Management of Data Storage", *Proceedings of the 1st International Workshop on Hot Topics in Dependability (HotDep); IEEE Communications Society*, (Mar. 2005), 6 pages.

Douglis, "Position: short object lifetimes require a delete-optimized storage system", *Proceedings of the 11th workshop on ACM SIGOPS European workshop*, (Sep. 19, 2004), 6 pages.

Hildrum, et al., "Storage optimization for large-scale distributed stream-processing systems", *ACM Transactions on Storage*(TOS), vol. 3, Issue 4, Article No. 5, (Feb. 2008), 28 pages.

Li, et al., "Nitro: A Capacity-Optimized SSD Cache for Primary Storage", *Proceedings of USENIX ATC '14: 2014 USENIX Annual Technical Conference*, https://www.usenix.org/conference/atc14/technical-sessions/presentation/li_cheng_1, (Jun. 19-20, 2014), pp. 501-512.

Cao, et al., "Cost-Aware WWW Proxy Caching Algorithms", *Proceedings of the USENIX Symposium on Internet Technologies and Systems*, (Dec. 1997), 15 pages.

Jaleel, et al., "High Performance Cache Replacement Using Rereference Interval Prediction (RRIP)", *ISCA*, (Jun. 19-23, 2010), 12 pages.

Jiang, et al., "LIRS: An efficient low inter-reference recency set replacement policy to improve buffer cache performance", *Proc. ACM Sigmetrics Conf.*, (2002), 12 pages.

Megiddo, et al., "ARC: A self-tuning, low overhead replacement cache", *USENIX File & Storage Technologies Conference(FAST)*, (Mar. 2003), 17 pages.

Oh, et al., "Caching less for better performance: Balancing cache size and update cost of flash memory cache in hybrid storage systems", *FAST*, (2012), 14 pages.

Phalke, et al., "An Inter-Reference Gap Model for Temporal Locality in Program Behavior", *SIGMETRICS, ACM*, (1995), 10 pages.

Robinson, et al., "Data Cache Management Using Frequency-based Replacement", *SIGMETRICS, ACM*, (1990), 9 pages.

Smaragdakis, et al., "EELRU: Simple and Effective Adaptive Page Replacement", *SIGMETRICS*, (1999), 12 pages.

Tang, et al., "RIPQ: Advanced Photo Caching on Flash for Facebook", *Proceedings of the 13th USENIX Conference on File and Storage Technologies*(FAST '15), (Feb. 16-19, 2015), 15 pages.

Wang, et al., "WOLF—A Novel Reordering Write Buffer to Boost the Performance of Log-Structured File Systems", *Proceedings of the FAST 2002 Conference on File and Storage Technologies*, (Jan. 28-30, 2002), 15 pages.

Zhou, et al., "The multi-queue replacement algorithm for second level buffer caches", *Proceedings of the 2001 USENIX Annual Technical Conference*, (Jun. 2001), 15 pages.

* cited by examiner

Deferred Scoring

Cache unit corresponding to cache unit metadata 1001 was accessed at time 200
Right shift a "1" value for every 10 seconds since last access

METHODS TO EFFICIENTLY IMPLEMENT COARSE GRANULARITY CACHE EVICTION BASED ON SEGMENT DELETION HINTS

CROSS-REFERENCE TO RELATED APPLICATIONS

This application is related to the following applications, which are hereby incorporated by reference to the extent they are consistent with this disclosure:
(1) Application Ser. No. 14/609,889, filed Jan. 30, 2015, entitled "METHODS TO EFFICIENTLY IMPLEMENT COARSE GRANULARITY CACHE EVICTION;"
(2) Application Ser. No. 14/609,902, filed Jan. 30, 2015, entitled "METHODS TO SELECT SEGMENTS OF AN EVICTED CACHE UNIT FOR REINSERTION INTO THE CACHE;" and
(3) Application Ser. No. 14/609,928, filed Jan. 30, 2015, entitled "METHOD TO DECREASE COMPUTATION FOR CACHE EVICTION USING DEFERRED CALCULATIONS."

FIELD

Embodiments of the invention relate to storage systems; and more specifically, to cache management.

BACKGROUND

A typical data storage system includes a cache device (herein simply referred to as a cache) that stores data so that future requests for that data can be served faster. The data that is stored within a cache might be values that have been computed earlier or duplicates of original values that are stored elsewhere. If the requested data is contained in the cache (herein referred to as a cache hit), this request can be served by simply reading the cache, which is comparatively faster. On the other hand, if the requested data is not contained in the cache (herein referred to as a cache miss), the data has to be recomputed or fetched from its original storage location, which is comparatively slower. Hence, the greater the number of requests that can be served from the cache, the faster the overall system performance becomes.

In some systems, items are accessed and replaced within a cache at the same granularity. In others, hardware features may require these to be done at a different granularity. In particular, types of solid-state drives (SSDs) or other forms of persistent memory may require that data be "erased" at a granularity larger than reads and writes can be performed. SSDs have a limited endurance, i.e. a given region of an SSD can only be erased a limited number of times before performance degradation or write errors ensue. It is therefore beneficial to limit the number of erasures to an SSD.

As used herein, a cache comprises segments (e.g., 16 kilobytes (KB) in size) that are grouped at a larger granularity referred to as a cache unit (e.g., 1 megabyte (MB) in size). Segments may be fixed or variable-sized. As used herein, a "segment" is data unit of each cache access, and a "cache unit" is a data unit of cached data that are evicted by the cache manager at the same time. Once a cache unit is evicted, it can be erased and reused. When a cache client inserts a segment (e.g., writes data to the system), a cache manager packs it within a partially-full cache unit. When the cache unit is full, the cache manager writes it to the system (e.g., a storage device) and updates the index to indicate where the data is stored in the storage device. When a cache client requests a segment using a key, such as a <filehandle and offset> or a segment fingerprint such as a SHA1 hash, and the requested segment already exists in the cache, the cache manager provides the cached data to the client. If the requested data does not exist in the cache, the cache manager uses a corresponding index to determine the segment location in the storage device. The cache manager then fetches the segment from the storage device, and provides it to the client. In either case, the cache manager then may update a timestamp to indicate when the segment/cache unit was accessed.

In order for a cache to be effective at reducing system latency, it must contain the hottest (i.e., most relevant) data. In this regard, when a cache is full, colder (i.e., less relevant) data stored in the cache must be evicted to make room for new data. Conventionally, recency information is used to support a least-recently-used (LRU) eviction policy (or related policies). Under such a policy, the LRU cache unit is evicted. Such a simplistic approach, however, is problematic for coarse-granularity cache eviction. For example, if a cache unit has one hot segment, and the remaining segments are cold, under the conventional approach, the cache unit is not evicted even though it contains mostly irrelevant data.

BRIEF DESCRIPTION OF THE DRAWINGS

Embodiments of the invention are illustrated by way of example and not limitation in the figures of the accompanying drawings in which like references indicate similar elements.

DESCRIPTION OF EMBODIMENTS

Figure 1:
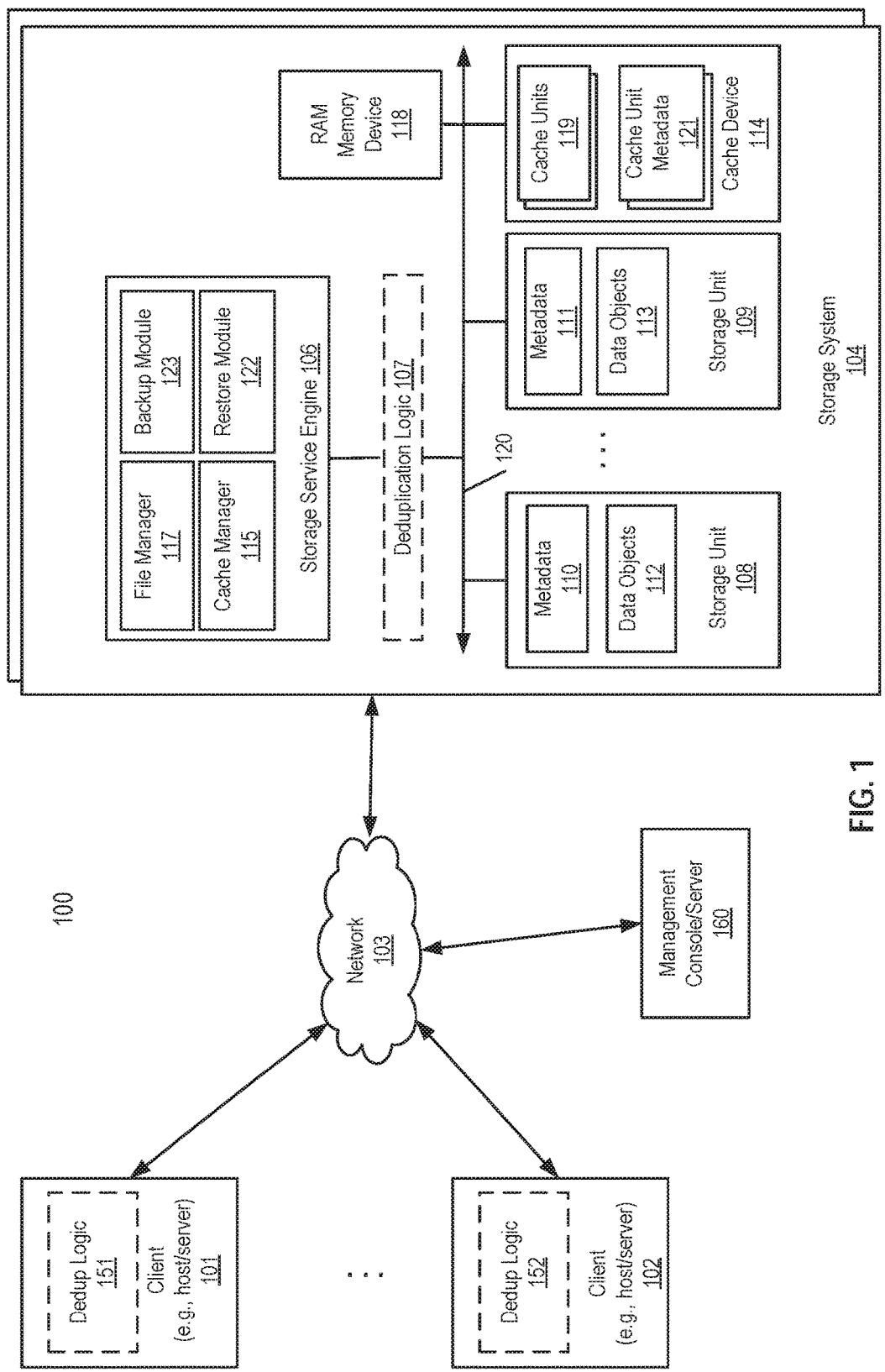
FIG. 1 is a block diagram illustrating a system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

References in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Techniques for performing cache management are described herein. According to one embodiment, a storage system includes a cache manager configured or adapted to receive input/output (I/O) requests (e.g., from a file manager) to access file blocks. As used herein, a "file block" is a data unit of each I/O request to read/write data from/to the storage system. In some systems a file block corresponds to a segment, in other systems, a segment may be variable-sized. The file manager maps file blocks into segments depending on their relative size, either aggregating or dividing as necessary, and stores/buffers the segments in a random access memory (RAM). The cache manager then packs (i.e., groups) the segments into cache units. When a cache unit is full, the cache manager writes it to storage, for example, in a persistent storage device. In some instances, the cache may become full, and the cache manager must perform cache eviction to make room for new data to be cached. Throughout the description, references are made to a cache being full. As used herein, a "full" cache refers to a cache that is full or has exceeded some fullness threshold. Because of the hardware properties of flash and other cache devices, it is not possible to update a portion of a cache unit, so it is typically erased in its entirety at eviction.

Conventionally, a cache unit is evicted based simply on how recently it has been accessed as compared to other cache units in the cache device. Such a simplistic approach, however, is problematic. By way of example, suppose a first cache unit includes a segment that is most recently used (i.e., the hottest segment in the cache), and all other segments in this first cache unit have not been used for quite some time (i.e., the coldest segments in the cache). Assume further that a second cache unit includes segments which have all been recently accessed, albeit not as recently accessed as the hottest segment in the first cache unit. Under the conventional approach, the second cache unit is evicted and the first cache unit is not evicted, because the first cache unit was the most recently accessed, even though most of the segments in the first cache unit are irrelevant. Further, all relevant data in the second cache unit has been evicted, thus decreasing the effectiveness of the cache.

Embodiments of the present invention overcome these limitations by performing cache evictions based on other criteria in addition to recency. According to one embodiment, the cache manager of the present invention scores each cache unit based on one or more criteria, including but not limited to, segment validity, segment age, priority of the file to which a segment belongs, segment access count, and hotness. The scoring functions are described in further detail below.

As described above, there may be instances where a few of the segments in a cache unit are hot, while most of the other segments in the same cache unit are cold. Evicting such a cache unit results in relevant data being removed from the cache, and thus, decreasing its effectiveness. In one embodiment, the cache manager of the present invention overcomes such limitations by copying the hot segments from the evicted cache unit to another cache unit. In this way, the relevant data are not removed from the cache, and the cache hit rate is not adversely affected. Various embodiments of the present invention shall become apparent through the description of the figures below.

FIG. 1 is a block diagram illustrating a system according to one embodiment of the invention. Referring to FIG. 1, system 100 includes, but is not limited to, one or more client systems 101-102 communicatively coupled to storage system 104 over network 103. Any of clients 101-102 may be any type of client such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of network such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of server or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic or module 123 and restore logic or module 122. Backup logic or module 123 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Data deduplication is a process by which a data storage system can detect multiple identical copies of data and only keeps a single copy of that data, thus eliminating the redundant data by preventing identical copies from being stored, thereby improving storage utilization. In at least some systems, data deduplication requires iterating over a set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves a unique copy of each block. For example, if only a few bytes of a document, presentation, or file are changed, only the changed blocks are saved. The changes made to a few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmitting the data to storage system 104, each of deduplication engines 151-152 may segment the data into multiple chunks and determine whether the chunks have been previously stored at storage system 104. In one embodiment, chunks are transmitted only if they have not been previously stored in storage system 104. In this way, only chunks not yet stored on storage system 104 are sent to storage system 104.

For example, when client 101 is about to transmit a data stream (e.g., a file or a directory of one or more files) to storage system 104, deduplication logic 151 is configured to partition the data stream into segments. For each of the segments, client 101 transmits a fingerprint or representative of the segment to storage system 104 to determine whether that particular segment has already been stored in storage system 104. A segment that has been stored in storage system 104 may have been previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Storage system 104 may further include other standard components, such as a file system hosted by an operating system. A file system typically includes metadata describing attributes of the file system and data from a user of the file system. A file system contains a range of file system blocks that store metadata and data. A client or user of a file system accesses the file system using a logical address (a relative offset in a file) and the file system converts the logical address to a physical address of a disk storage that stores the file system.

Every file includes an index node (also referred to simply as "Mode") that contains the metadata (such as permissions, ownerships, timestamps) about that file. The contents of a file are stored in a collection of data blocks. An Mode of a file defines an address map that converts a logical address of the file to a physical address of the file. Further, in order to create the address map, the Mode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in a hierarchy depending upon the size of a file where each level of indirect blocks includes pointers to indirect blocks at the next lower level. An indirect block at the lowest level of the hierarchy is known as a leaf indirect block. In some embodiments, a key to the cache may include an Mode.

A file may be replicated by using a snapshot copy facility that creates one or more replicas (also referred to as "snapshot copies") of the file. A replica or snapshot of a file is a point-in-time copy of the file. Similarly, a snapshot of a file system is a persistent point-in-time image of the active file system, which may be used to quickly recover data after data has been corrupted, lost, or modified. Further, each replica of a file is represented by a version file that includes an inheritance mechanism enabling metadata (e.g., indirect blocks) and data (e.g., direct data blocks) of the file to be shared across one or more versions of the file. If a file becomes corrupted, the file is restored with its most recent snapshot copy that has not been corrupted. In one embodiment for a deduplicated cache, a segment may be referenced by multiple versions of a file. If a portion of a file is deleted or overwritten, the corresponding segments may be marked as deprecated (as discussed in more detail below) since they are not useful for that file version, but other file versions may still access those segments.

Note that some or all of the components as shown and described above (e.g., storage service engine 106 and/or deduplication logic 107 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific integrated circuit (IC) or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

In one embodiment, storage service engine 106 includes file manager 117, which can be executed by a processor to provide an interface to access files stored at storage system 104. File manager 117 may be part of a file system service interface. In one embodiment, file manager 117 interfaces with cache manager 115 to access (e.g., read/write) data from/to storage. For example, in response to a request from file manager 117 to read data from storage, cache manager 115 determines whether the requested data is currently stored in one or more cache units 119 of cache device 114. In response to determining the requested data is currently stored in cache device 114 (herein referred to as a cache hit), the requested data is fetched from cache device 114 and stored in RAM 118. In some embodiments the RAM is part of the cache manager, and a caching policy is used to manage segments in the cache's RAM. In other embodiments, the RAM is outside of the cache manager, and the RAM may be used to cache segments according to a caching policy. Typically, a RAM cache is smaller than the device cache. File manager 117 then reads the requested data from RAM 118 and presents the requested data to the requesting client (e.g., clients 101-102).

In response to determining the requested data is not cached in cache device 114 (herein referred to as a cache miss), cache manager 115 fetches the requested data from storage (e.g., storage units 108-109) or causes storage system 104 to re-compute the requested data, and stores the requested data in RAM 118 to be presented to the client by file manager 117. Further, cache manager 115 may cache the requested data in cache units 119 of cache device 114 in order to provide faster access to the requested data in the near future. The cache manager may choose not to insert the requested data into the cache device because its priority does not justify insertion. By way of further example, in response to a request from file manager 117 to write data to storage, cache manager 115 caches the write data in cache units 119 of cache device 114 in order to provide faster access to the write data in the near future.

In some instances, when data is to be populated in cache device 114, cache manager 115 may have to evict one or more cache units of cache units 119 in order to make room for the new data. As used herein, "evicting" a cache unit refers to the reusing of the cache unit to store new data. In other words, evicting a cache unit involves overwriting the cache unit with new data. In one embodiment, each cache unit of cache units 119 is associated with a set of cache unit metadata 121. In order to efficiently perform cache eviction such that the cache hit rate is minimally affected, cache manager 115 selects a cache unit with the most irrelevant data based on its corresponding cache unit metadata. Throughout the description, cache unit metadata are described as being stored as part of the cache device. It should be understood, however, that the cache unit metadata can be stored in other storage devices accessible by storage system 104. For example, cache unit metadata 121 can be stored as part of RAM 118. In particular, volatile metadata such as access times are typically stored in RAM. Similarly, storage service engine 106 and/or deduplication logic 107 may be executed in RAM 118 by a processor (not shown).

Throughout the description, data caching and cache eviction are described in specific contexts (e.g., data access from/to storage). One having ordinary skill in the art would recognize that the techniques described herein are equally applicable to any application that requires data to be cached, and are not limited to data access from/to storage. Further, the caching mechanisms described herein apply equally in various layers in the storage stack. For example, the caching and eviction mechanisms described herein apply to data before and/or after deduplication. Embodiments of the present invention shall now be described in greater detail through the description of various other figures below, in which like references indicate similar elements.

Figure 2:
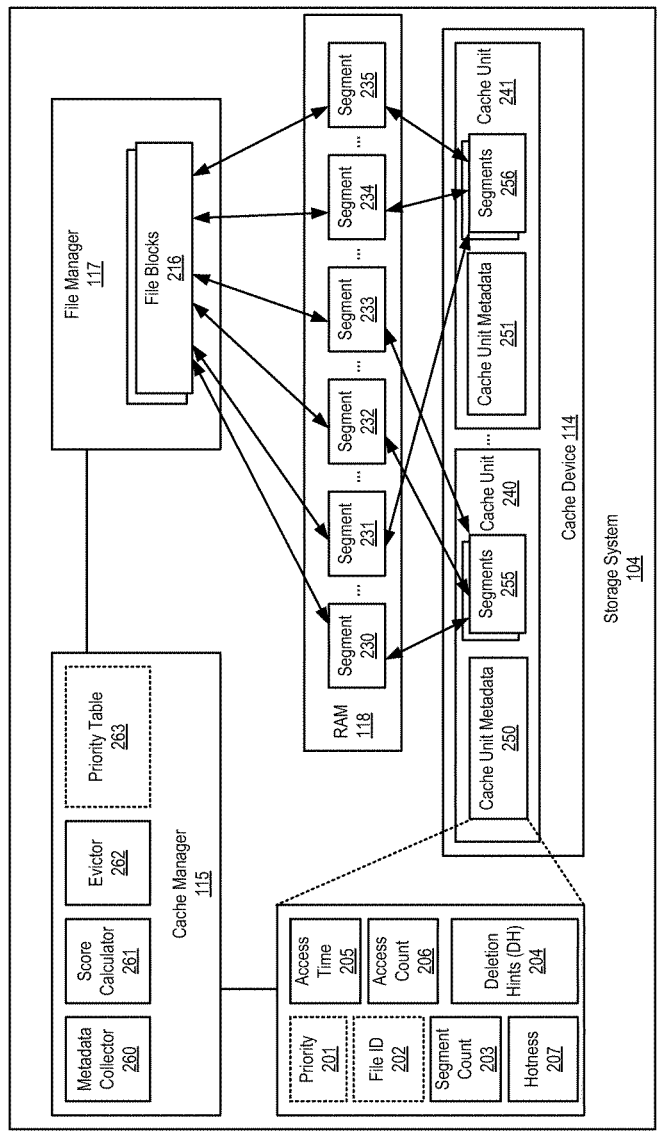
FIG. 2 is a block diagram illustrating a storage system according to one embodiment.

FIG. 2 is a block diagram illustrating a storage system according to one embodiment. The storage system illustrated in FIG. 2 is similar to the storage system in FIG. 1. Certain details have been omitted, however, in order to avoid obscuring the invention. Further, certain other details of storage system 104 have been added in FIG. 2 in order to better illustrate the invention.

According to one embodiment, file manager 117 receives file blocks 216 (e.g., from clients 101-102) to be stored at storage system 104. File manager 117 partitions file blocks 216 into segments 230-235 and stores them in RAM 118. It is to be appreciated that the number of segments shown is for illustrative purposes, and not intended to be limitations of the present invention. Cache manager 115 is to cache segments 230-235 in cache device 114 so that they can be accessed quickly in the near future. In the illustrated example, segments 230, 232, and 233 (collectively shown as segments 255) are grouped into cache unit 240, and segments 231, 234, and 235 (collectively shown as segments 256) are grouped into cache unit 241.

Cache manager 115 includes, but is not limited to, metadata collector 260, score calculator 261, and evictor 262. In one embodiment, metadata collector 260 collects and maintains a set of cache unit metadata for each cache unit of cache device 114. In the illustrated example, metadata collector 260 collects and maintains cache unit metadata 250-251 for cache units 240-241, respectively.

According to one embodiment, score calculator 261 is to use at least a portion of cache unit metadata 250-251 to score cache units 240-241, respectively, for eviction purposes. For example, score calculator 261 determines a score for cache unit 240 using at least a portion of cache unit metadata 250, and determines a score for cache unit 241 using a least a portion of cache unit metadata 251. In one embodiment, evictor 262 then determines which cache unit to evict based on the determined scores.

In one embodiment, cache unit metadata 250 includes, but is not limited to, priority 201, file identifier (ID) 202, segment count 203, deletion hints (DH) 204, access time 205, access count 206, and hotness 207. Throughout the description, metadata are described as being implemented or maintained at different granularities. It should be understood that the granularities include, but are not limited to, segment granularity, segment group granularity, and cache unit granularity, as defined herein. "Segment granularity" refers to the metadata being maintained for each segment in the cache unit. "Segment group granularity" refers to the metadata being maintained for each segment group. "Cache unit granularity" refers to the metadata being maintained for each cache unit. It should be understood that a segment group refers to a group of predetermined (e.g., consecutive) segments in the cache unit. A segment group is to be distinguished from the cache unit in that a segment group contains a number of segments that are less than the total number of segments in the cache unit. In another embodiment, we may track access history per segment granularity, segment group granularity, and cache unit granularity, where access history includes one or more access time stamps, access counts, and hotness.

According to one embodiment, priority 201 can be implemented at different granularities. For example, when implemented at the segment granularity, priority 201 contains a priority level for each segment contained in cache unit 240. When implemented at the segment group granularity, priority 201 contains a priority level for each segment group in cache unit 240. When implemented at the cache unit granularity, priority 201 contains a single priority level for all segments in cache unit 240. In some embodiments, priority could be associated with a file, directory, volume, etc. and would be applied to the segments within that unit. The priority information may be preconfigured by an administrator, for example, via an application programming interface (API), stored in a persistent storage device as part of configuration information or storage policies, and then loaded into the system memory during the operations.

In one embodiment, a high priority level indicates that the segment is relevant. Other conventions, however, can be used. In one embodiment, the priority level is provided by a cache client. For example, when a client requests access to a file, it may provide as part of the request a priority level that is to be associated with the segments of the requested file. Alternatively, a cache client may send a request (that is separate from the access request) to cache manager 115 to set the priority of segments of a file. Priority levels, in another embodiment, can be presented to cache manager 115 by other sources (e.g., a system administrator). Irrespective of where the priority level originates from, cache manager 115 updates priority 201 using the priority level information provided.

File priorities may change over time because a file may be accessed for multiple reasons. By way of example, a file to be backed up may have a low priority, for example, based on configuration or policies. In contrast, a restore of the same file (e.g., due to a disaster on the primary storage system) may cause it to have a high priority. Thus, it is more advantageous to store file IDs (as opposed to file priorities) as part of the cache unit metadata because the priority change can be applied at the priority table instead of updating a priority for every corresponding segment of every cache unit.

According to one embodiment, instead of storing the file priorities as part of cache unit metadata 250, the file priorities can be stored as part of priority table 263 which records a priority for each file ID. The priority table can be stored in a storage device accessible by cache manager 115. In such an embodiment, cache unit metadata 250 includes file ID 202, which can be implemented at different granularities. For example, when implemented at the segment granularity, file ID 202 contains a file ID for each segment contained in cache unit 240. When implemented at the segment group granularity, file ID 202 contains a file ID for each segment group in cache unit 240. When implemented at the cache unit granularity, file ID 202 contains a single file ID for all segments in cache unit 240. A file ID identifies a file to which a respective segment or group of segments belongs to. A file ID may be a full file name, a hash of the filename, an Mode ID, a combination of file labels, or any other value that distinguishes files in the storage system.

According to one embodiment, segment count 203 can be implemented at different granularities. For example, when implemented at the segment group granularity, segment count 203 contains a count value for each segment group in cache unit 240, each count value indicating the total number segments in the respective segment group. When implemented at the cache unit granularity, segment count 203 contains a single count value for the entire cache unit 240, the count value indicating the total number of segments in cache unit 240. For example, as segments are inserted into cache unit 240, cache manager 115 updates segment count 203 to track the number of inserted segments, and when cache unit 240 is evicted, cache manager 115 resets segment count 203 to 0. Optionally, if the segment count is implemented at the segment group granularity, a segment count may also be maintained at the cache unit granularity where its value equals the sum over the segment groups.

According to one embodiment, cache manager 115 can mark a segment with a deletion hint (DH) based on a request from a cache client, or any other source (e.g., a system administrator). For example, if a file is partially overwritten, a cache client may wish to mark the corresponding segments of the file as invalid, meaning that it is incorrect to return those segments given a key. In response to such a request, cache manager 115 identifies the corresponding segment in cache device 114, and marks the segment as invalid in the corresponding cache unit metadata by setting the corresponding DHs for those segments. A DH in this case indicates that the segment is invalid and should not be returned if its key is queried in the future. In an alternative embodiment, a client may use the DH to indicate that a segment is unlikely to be queried in the future, but if queried with its key, the corresponding segment is valid and should be returned. We refer to this case as deprecation of segments. Deprecated segments exist, for example, in deduplicated storage systems, where a segment in the cache could be referenced by multiple files. In the case that one of the files is deleted or partially overwritten, a DH may be set to indicate the segment is unlikely to be accessed in the future. If a client accesses a file that references the segment with the same key (such as a SHA1 hash of the segment's content), it is permissible to return the segment, even though it is marked with a DH. It should be noted that in such a case the cache manager may unset the DH status for that segment. For example, a cache client may send a request to cache manager 115 requesting that segment(s) that were previously marked with DH should have their status returned to the no-DH state. Whether a DH indicates a segment is invalid (should not be returned) or deprecated (can be returned) is a configuration parameter to the cache manager. Throughout the description, two embodiments of DH are described (i.e., invalidated segments and deprecated segments). The term "valid", however, is used in both embodiments. It should be understood that the term "valid" refers to segments that are neither invalid nor deprecated, depending on the embodiment. Valid segments have a DH value of 0, while invalid/deprecated segments have a DH value of 1. Valid segments have a higher value for being retained in the cache than segments marked with a DH.

According to one embodiment, DH 204 can be implemented at different granularities. For example, when implemented at the segment granularity, DH 204 can include DH status for each segment in cache unit 240. In one such embodiment, DH 204 can be implemented as a bit map. For example, DH 204 can be implemented as one bit map for the entire cache unit (or a bit map for each segment group of the cache unit), wherein each bit of the bit map indicates the DH of a segment. The offset of a bit in the bit map corresponds to the ordinal position of a segment in the cache unit or segment group, depending on the granularity of DH tracking.

According to one embodiment, instead of containing a bit map to represent the DHs of segments, DH 204 can be implemented as a validation count that indicates the total number of valid segments. For example, in an embodiment where DH 204 is maintained at the segment group granularity, DH 204 can include a validation count for each segment group, wherein each validation count indicates the total number of valid segments in the segment group. In an embodiment where DH 204 is maintained at the cache unit granularity, DH 204 can include a validation count for the entire cache unit 240, wherein the validation count indicates the total number of valid segments in the cache unit. It should be understood that a count of the invalid/deprecated segments can be maintained at each granularity instead of, or in addition to, a validation count.

According to one embodiment, access time 205 can be implemented at different granularities. For example, when implemented at the segment granularity, access time 205 contains a timestamp for each segment contained in cache unit 240, each timestamp indicating when the respective segment was last accessed. When implemented at the segment group granularity, access time 205 contains a timestamp for each segment group in cache unit 240, each timestamp indicating when any segment of the respective segment group was last accessed. When implemented at the cache unit granularity, access time 205 contains a single timestamp indicating when any of the segments in cache unit 240 was last accessed.

As described below, some scoring functions are based on the age of a segment, segment group, or cache unit. In such cases, cache manager 115 is to determine the age of a segment, segment group, or cache unit based on the respective timestamp and the current time (e.g., by subtracting the respective timestamp from the current time).

As described below, some scoring functions are based on reuse distance. In such embodiments, access time 205 contains two timestamps for each segment, segment group, or cache unit, wherein the two timestamps indicate the last two most recent accesses of the respective segment, segment group, or cache unit. Some embodiments may retain more than two most recent accesses. In another embodiment, instead of recording two or more timestamps, it may retain a timestamp for the most recent access and a value(s) indicating the time(s) since the access(es) previous to the most recent as this may decrease the bits required to maintain the reuse distance.

According to one embodiment, in order to reduce the memory space usage, instead of maintaining a timestamp for each segment, access time 205 can be implemented as a list of a predetermined number of most recently accessed segments per cache unit. By way of example, access time 205 can be implemented as a list of a predetermined number of entries. Each entry includes a timestamp and a segment ID, wherein the timestamp indicates the time of the last access to the segment identified by the segment ID. In such an embodiment, as segments are accessed, the list is updated such that the most recently accessed segments are represented by the list.

According to one embodiment, in order to reduce the memory space usage, instead of maintaining a timestamp for each segment, access time 205 can be implemented as a range list of most recently accessed segments per cache unit. By way of example, access time 205 can be implemented as a range list of a predetermined number of entries. Each entry includes a timestamp and a segment range, wherein the timestamp of the range is the last access time of the most recently accessed segment in the range and represents the time of the last access to the range. In such an embodiment, as segments are accessed, the range list is updated such that the most recently accessed segment ranges are represented by the range list. For example, a range list may indicate that segments 0-5 were accessed at time 3, and segments 12-21 were accessed at time 8, etc.

According to one embodiment, access count 206 can be implemented with different granularities. For example, when implemented at the segment granularity, access count 206 contains a count value for each segment contained in cache unit 240, each count value indicating the number of times the respective segment has been accessed. When implemented at the segment group granularity, access count 206 contains a count value for each segment group in cache unit 240, each count value indicating the total number of times any segment of the respective segment group has been accessed. When implemented at the cache unit granularity, access count 206 contains a single count value for the entire cache unit 240, the count value indicating the total number of times any of the segments in cache unit 240 has been accessed.

According to one embodiment, hotness 207 can be implemented with different granularities. For example, when implemented at the segment granularity, hotness 207 contains a register of bits (e.g., a shift register) for each segment contained in cache unit 240, each register containing a value which is derived based on how frequently the respective segment has been accessed and the age since those accesses. When implemented at the segment group granularity, hotness 207 contains a register for each segment group in cache unit 240, each register containing a value indicating how frequently the respective segment group has been accessed. When implemented at the cache unit granularity, hotness 207 contains a single register for the entire cache unit 240, the register containing a value indicating how frequently and recently cache unit 240 has been accessed.

In one embodiment, hotness 207 is implemented such that when a segment, segment group, or cache unit is accessed, cache manager 115 causes a "1" value to be left shifted into the respective register. Alternatively, when a segment is accessed, cache manager 115 causes the respective register to be incremented by 1. When the segment, segment group, or cache unit is aged (e.g., it has not been accessed within a predetermined duration of time), cache manager 115 causes a "0" value to be right shifted into the respective register. Alternatively, when the segment, segment group, or cache unit is aged, cache manager 115 causes the respective register to be decremented by 1. In such embodiments, the numerical value of the register represents the "hotness" of the respective segment, segment group, or cache unit. For example, a high value indicates the segment, segment group, or cache unit is hot/relevant. Other conventions, however, can be implemented.

As described above, the metadata can be stored at different granularities. For example, access time 205 can contain a timestamp for each segment contained in cache unit 240, or a timestamp for each segment group in cache unit 240, or a single timestamp for the entire cache unit 240. It should be understood that in embodiments where the metadata is stored at the segment group granularity or cache unit granularity, the respective metadata is updated whenever a segment within the segment group or cache unit, respectively, is accessed. By way of example, in an embodiment where access time 205 contains a timestamp for each segment group, the timestamp is updated whenever any segment of the respective segment group is accessed. By way of further illustration, in an embodiment where access time 205 contains a timestamp for the entire cache unit, the timestamp is updated whenever any segment in cache unit 240 is accessed.

As described below, cache manager 115 (e.g., score calculator 261 of cache manager 115) can score the cache units at different granularities. For example, cache manager 115 may score the cache units at the cache unit level. Alternatively, cache manager 115 can score each segment or segment group of a cache unit, and then perform some predetermined function on the segment scores or segment group scores to derive the cache unit score. By way of example, cache manager 115 can determine a maximum, minimum, average, sum, etc., of the segment scores or segment group scores to derive the cache unit score. Other functions can be used without departing from the broader scope and spirit of the present invention.

In an embodiment where cache manager 115 scores the cache units at the cache unit level, but the metadata are stored at a finer granularity (e.g., segment granularity or segment group granularity), cache manager 115 is to derive the metadata at the cache unit granularity by performing some predetermined function on the segment level or segment group level metadata. By way of example, suppose cache manager 115 is to determine a cache unit score based on an access time of the cache unit, but the access times are stored at the segment level. In such a case, cache manager 115 can determine a maximum, minimum, average, sum, etc., of all scores for access times that are stored at the segment level for the cache unit to derive the access time of the cache unit. Other functions can be used without departing from the broader scope and spirit of the present invention.

Cache unit metadata 251 includes information similar to those included as part of cache unit metadata 250. For the sake of brevity, they will not be described here. Further, although two cache units are shown, one having ordinary skill in the art would recognize that cache device 114 can include more or less cache units, each associated with its own cache unit metadata.

Figure 3:
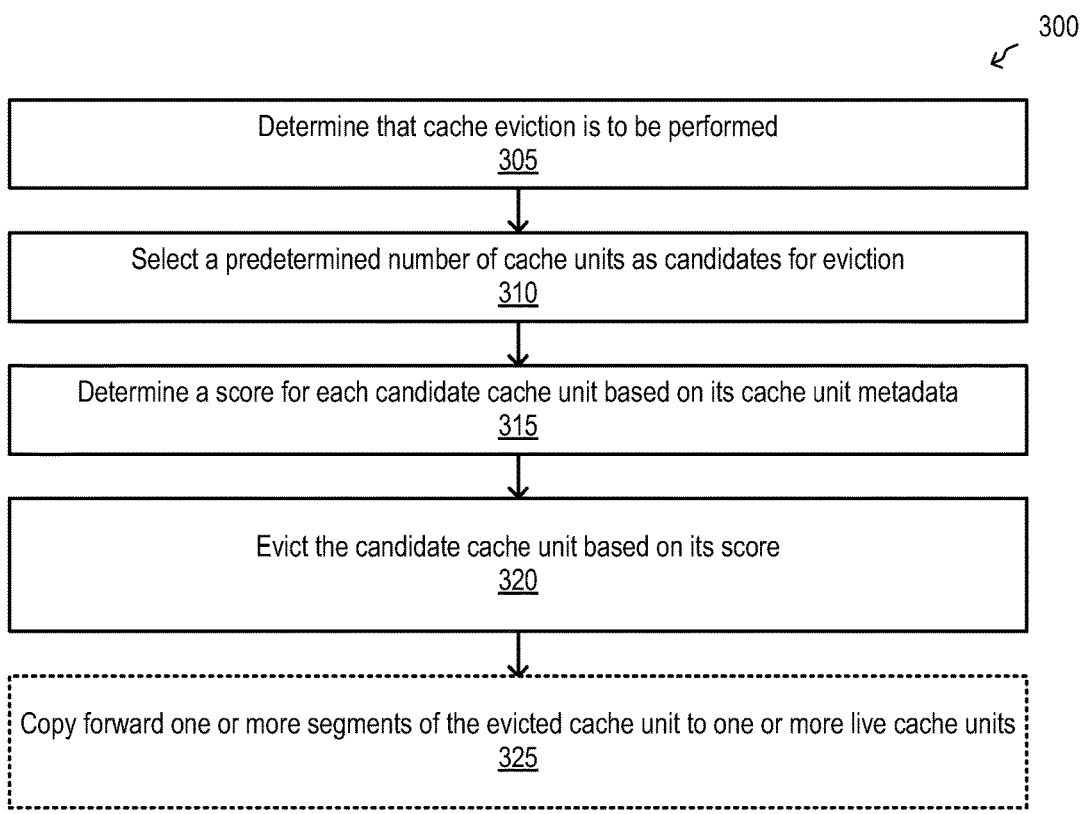
FIG. 3 is a flow diagram illustrating a method for performing cache eviction according to one embodiment.

FIG. 3 is a flow diagram illustrating a method for performing cache eviction according to one embodiment. For example, method 300 can be performed by cache manager 115, which can be implemented in software, firmware, hardware, or any combination thereof. Referring now to FIG. 3, at block 305 a cache manager determines that cache eviction is to be performed. At block 310, the cache manager selects a predetermined number of cache units as candidates for cache eviction.

At block 315, the cache manager determines a score for each candidate cache unit based on its cache unit metadata. The cache manager may determine the score at the cache unit level. Alternatively, the cache manager may determine the score at a segment or segment group level, and perform some predetermined function (e.g., maximum, minimum, average, sum, etc.) on the segment scores or segment group scores to derive the cache unit score.

At block 320, the cache manager evicts the candidate cache unit based on its score. For example, cache manager 115 can either evict the cache unit with the lowest score or evict the cache unit with the highest score, depending on the scoring function that is used. At block 325, the cache manager optionally copies forward one or more segments of the evicted cache unit to one or more live cache units in order to avoid evicting relevant data from the cache. As part of block 325, cache manager 115 may cause the updated one or more live cache units to be written to a storage device. While this example evicts a single cache unit, it should be understood that the process can be repeated to evict any number of cache units as specified by a client of the cache or to maintain a threshold of space availability in the cache.

Figure 4A:
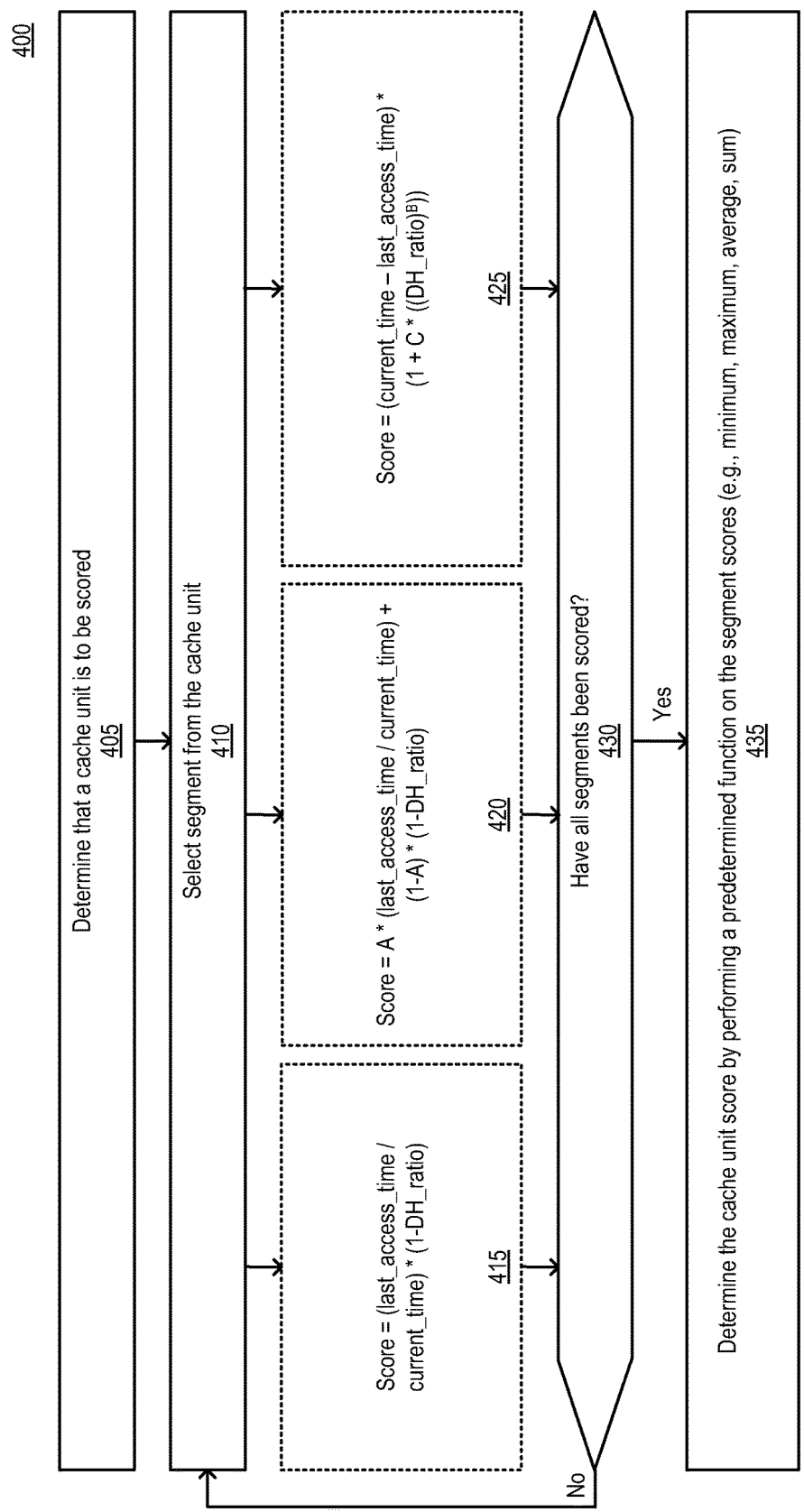
FIG. 4A is a flow diagram illustrating a method for scoring cache units at a segment granularity according to one embodiment.
Figure 4B:
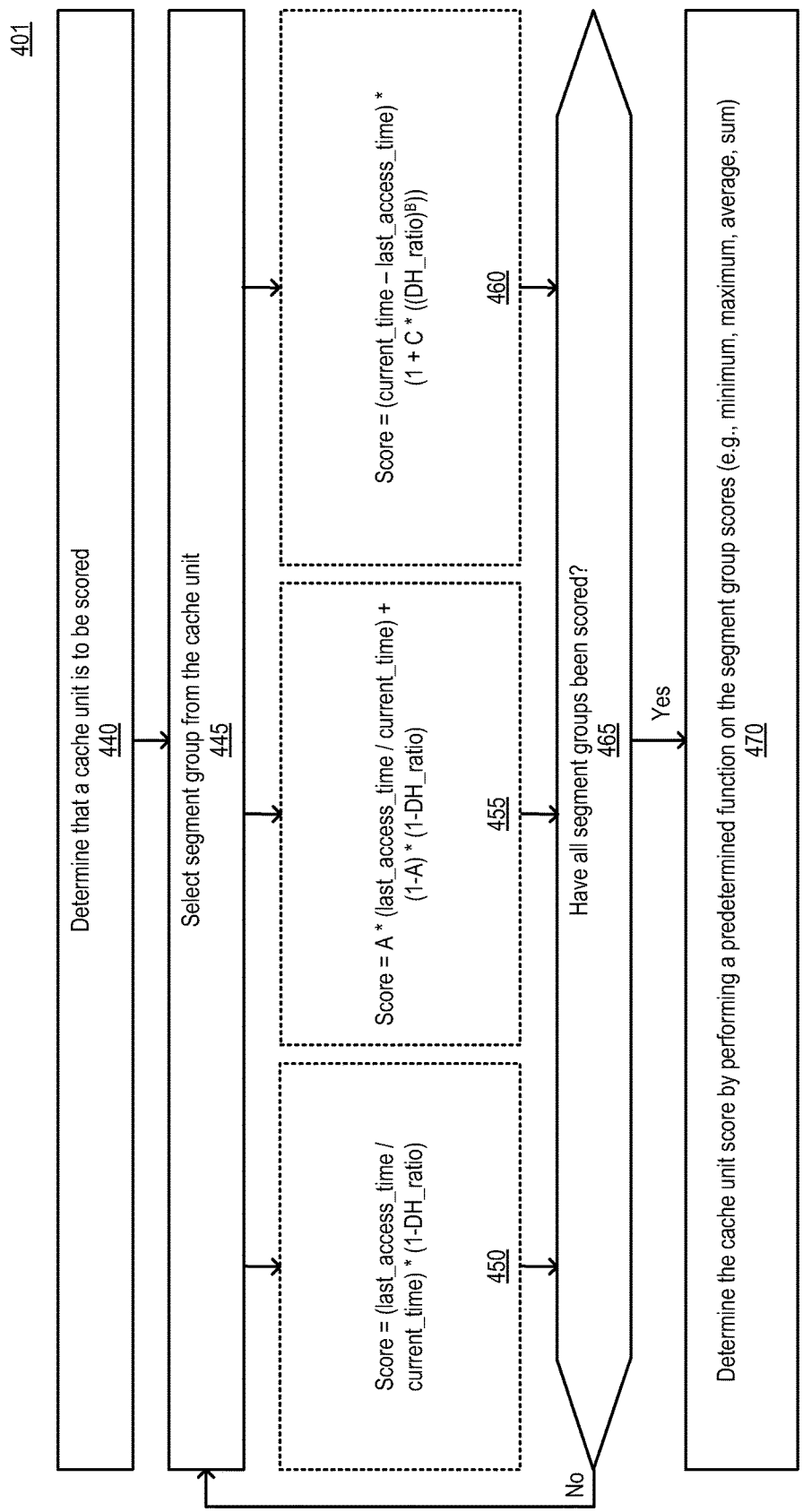
FIG. 4B is a flow diagram illustrating a method for scoring cache units at a segment group granularity according to one embodiment.
Figure 4C:
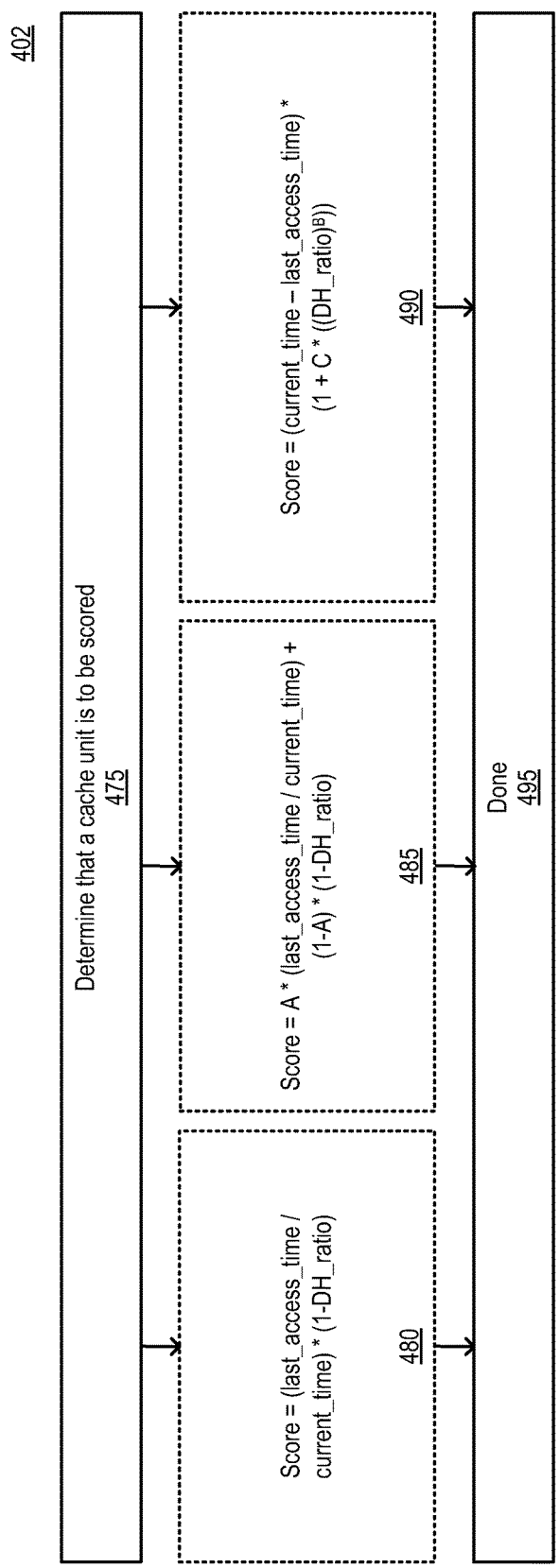
FIG. 4C is a flow diagram illustrating a method for scoring cache units at a cache unit granularity according to one embodiment.

FIGS. 4A-4C are flow diagrams illustrating methods for scoring cache units according to one embodiment. For example, methods 400-402 can be performed by cache manager 115, which can be implemented in software, firmware, hardware, or any combination thereof. FIG. 4A illustrates a method for scoring cache units at the segment granularity. FIG. 4B illustrates a method for scoring cache units at the segment group granularity. FIG. 4C illustrates a method for scoring cache units at the cache unit granularity.

Referring first to FIG. 4A, at block 405 a cache manager determines that a cache unit is to be scored. At block 410, the cache manager selects a segment from the cache unit. At optional block 415, the cache manager determines the segment score based on a current time, last access time of the segment, and/or the deletion hint associated with the segment. In a particular embodiment, the segment score may be determined by using a function similar to the following function:

$$\text{Score}=(\text{last\_access\_time}/\text{current\_time})*(1-DH\_\text{ratio}) \qquad (1)$$

where last_access_time is the time when the segment was last accessed (e.g., as represented by access time 205 of FIG. 2) and current_time is the current time of the system. In one embodiment, the cache manager maintains the DH of a segment as a binary (i.e., "0" or "1"). In such an embodiment, DH_ratio is 1 if the segment has the deletion hint set to true, and 0 if the deletion hint is set to false. In another embodiment, the cache manager maintains the valid state at a finer granularity. In one such embodiment, the cache manager can measure globally how frequently a segment switches from deprecated to valid relative to the number of deprecated segments. By way of example, suppose the cache manager has deprecated 100 segments, but 10 of those deprecated segments reverted back to being non-deprecated at a later point. In such an example, there is a 10% probability that deprecated segments may revert back to being non-deprecated. In one such embodiment, the cache manager can use the probability information to fine tune the DH_ratio. For example, suppose DH 204 indicates that the segment is deprecated. Without the probability information, cache manager 115 would determine the DH_ratio to be 1. With the probability information, cache manager 115 can determine a more accurate DH_ratio as 0.9 for the deprecated segment. In another embodiment, the probability of DH values changing from deprecated back to non-deprecated can be tracked per file, directory, volume, file region, or other granularities smaller than the entire storage system. As an example, the probability scores can be maintained for two separate directories, where the values determined based on changes to each directory.

At optional block 420, the cache manager determines the segment score by using a function similar to the following function:

$$\text{Score}=A*(\text{last\_access\_time}/\text{current\_time})+(1-A)*(1-DH\_\text{ratio}) \qquad (2)$$

where A is a predetermined constant (e.g., in the range of 0 to 1), and where last_access_time, current_time, and DH_ratio are defined as described above with respect to function (1).

At optional block 425, the cache manager determines the segment score by using a function similar to the following function:

$$\text{Score}=(\text{current\_time}-\text{last\_access\_time})*(1+C*((DH\_\text{ratio})^B)) \qquad (3)$$

where B and C are predetermined constants. For example, B can be 2 and C can be 3. Variables last_access_time, current_time, and DH_ratio are defined as described above with respect to function (1). It should be noted that by incorporating the constants A, B, and C in the above functions, the cache manager is able to assign different weights to different metadata.

At block 430, the cache manager determines whether all segments of the cache unit have been scored. In response to determining that not all segments have been scored, the cache manager returns back to block 410 to select another segment to be scored. At block 435, in response to determining all segments of the cache unit have been scored, the cache manager determines the cache unit score by performing a predetermined function on all the segment scores. For example, the cache manager may determine the minimum, maximum, average, sum, etc. of the segment scores.

It should be noted that typically the cache manager only performs the operations of either block 415, 420, or 425. In other words, the cache manager scores the segments using one function, not multiple functions. It should be further noted that the cache manager may evict the cache unit with either the highest score or the lowest score, depending on the employed scoring function. For example, the cache manager evicts the cache unit with the lowest score when a function such as function (1) or (2) is used. The cache manager evicts the cache unit with the highest score when a function such as function (3) is used.

Throughout the description, various functions are described for scoring purposes. The functions described herein are for illustrative purposes, and not intended to be limitations of the present invention. Other functions can be used without departing from the broader scope and spirit of the present invention. Throughout the description, various metric s/metadata are described as being used by the cache manager to calculate cache unit scores. One having ordinary skill in the art would recognize that such metrics/metadata can be used in any combinations thereof.

Referring now to FIG. 4B, at block 440 a cache manager determines that a cache unit is to be scored. At block 445, the cache manager selects a segment group from the cache unit. For example, the cache manager may select a predetermined number of consecutive segments or similar characteristics of the segments. At optional block 450, the cache manager determines the segment group score based on a current time, last access time of the segment group, and/or the deletion hint associated with the segment group. In a particular embodiment, the segment group score may be determined by using a function similar to the following function:

$$\text{Score}=(\text{last\_access\_time}/\text{current\_time})*(1-DH\_\text{ratio}) \quad (4)$$

where last_access_time is the time when the segment group was last accessed (e.g., as represented by access time 205 of FIG. 2) and current_time is the current time of the system. In one embodiment, the cache manager maintains the DH state of a segment as a binary (i.e., "0" or "1"). In such an embodiment, DH_ratio is defined as the ratio of the number of segments in the segment group with DH set to the total number of segments in the segment group. In another embodiment, the cache manager maintains the DH state at a finer granularity. In one such embodiment, the cache manager can measure the probability that a segment's DH state can revert from 1 to 0 as described above. In one such embodiment, the cache manager can use such probability information to fine tune the DH_ratio. For example, suppose segment count 203 and DH 204 of FIG. 2 indicate that the segment group contains 10 valid segments out of a total of 20 segments. Without the probability information, cache manager 115 would determine the DH_ratio to be 10/20 or 0.5. With the probability information (e.g., a 10% probability that an DH segment will revert back to being not set), cache manager 115 can determine a more accurate DH_ratio as DH_ratio*(1−0.10), i.e. (10/20*0.9) or 0.45 for the segment group.

At optional block 455, the cache manager determines the segment group score by using a function similar to the following function:

$$\text{Score}=A*(\text{last\_access\_time}/\text{current\_time})+(1-A)*(1-DH\_\text{ratio}) \quad (5)$$

where A is a predetermined constant in the range of 0 to 1, and where last_access_time, current_time, and DH_ratio are defined as described above with respect to function (4).

At optional block 460, the cache manager determines the segment group score by using a function similar to the following function:

$$\text{Score}=(\text{current\_time}-\text{last\_access\_time})*(1+C*((DH\_\text{ratio})B)) \quad (6)$$

where B and C are predetermined constants. For example, B can be 2 and C can be 3. Variables last_access_time, current_time, and DH_ratio are defined as described above with respect to function (4).

At block 465, the cache manager determines whether all segment groups of the cache unit have been scored. In response to determining that not all segment groups have been scored, the cache manager returns back to block 445 to select another segment group to be scored. At block 470, in response to determining all segment groups of the cache unit have been scored, the cache manager determines the cache unit score by performing a predetermined function on all the segment group scores. For example, the cache manager may determine the minimum, maximum, average, sum, etc. of the segment group scores.

It should be noted that typically the cache manager only performs the operations of either block 450, 455, or 460. In other words, the cache manager scores the segment groups using one function, not multiple functions. It should be further noted that the cache manager may evict the cache unit with either the highest score or the lowest score, depending on the employed scoring function. For example, the cache manager evicts the cache unit with the lowest score when a function such as function (4) or (5) is used. The cache manager evicts the cache unit with the highest score when a function such as function (6) is used.

Referring now to FIG. 4C, at block 475 a cache manager determines that a cache unit is to be scored. At optional block 480, the cache manager determines the cache unit score based on a current time, last access time of the cache unit, and/or the deletion hint associated with the cache unit. In a particular embodiment, the cache unit score may be determined by using a function similar to the following function:

$$\text{Score}=(\text{last\_access\_time}/\text{current\_time})*(1-DH\_\text{ratio}) \quad (7)$$

where last_access_time is the time when the cache unit was last accessed (e.g., as represented by access time 205 of FIG. 2) and current_time is the current time of the system. In one embodiment, the cache manager maintains the DH of a segment as a binary (i.e., "0" or "1"). In such an embodiment, DH_ratio is defined as the ratio of the number of segments in the cache unit with DH set to 1 and the total number of segments in the cache unit. In another embodiment, the cache manager maintains DH at a finer granularity. In one such embodiment, the cache manager can measure the probability that a segment can revert back from DH set to unset as described above. In one such embodiment, the cache manager can use such probability information to fine tune the DH_ratio. For example, suppose segment count 203 and DH 204 of FIG. 2 indicate that the cache unit contains 10 segments with DH set out of a total of 20 segments. Without the probability information, cache manager 115 would determine the DH_ratio to be 10/20 or 0.5. With the probability information (e.g., a 10% probability that a DH segment will revert back to DH unset), cache manager 115 can determine a more accurate DH_ratio as DH_ratio*(1−0.10), i.e. (10/20*0.9) or 0.45 for the segment group.

At optional block 485, the cache manager determines the cache unit score by using a function similar to the following function:

$$\text{Score}=A*(\text{last\_access\_time}/\text{current\_time})+(1-A)*(1-DH\_\text{ratio}) \quad (8)$$

where A is a predetermined constant (e.g., in the range of 0 to 1), and where last_access_time, current_time, and DH_ratio are defined as described above with respect to function (7).

At optional block 490, the cache manager determines the cache unit score by using a function similar to the following function:

$$\text{Score}=(\text{current\_time}-\text{last\_access\_time})*(1+C*((DH\_\text{ratio})^B)) \quad (9)$$

where B and C are predetermined constants. For example, B can be 2 and C can be 3. Variables last_access_time, current_time, and DH_ratio are defined as described above with respect to function (7). At block 495, the method is completed.

It should be noted that typically the cache manager only performs the operations of either block 480, 485, or 490. In other words, the cache manager scores the cache units using one function, not multiple functions. It should be further noted that the cache manager may evict the cache unit with either the highest score or the lowest score, depending on the employed scoring function. For example, the cache manager evicts the cache unit with the lowest score when a function such as function (7) or (8) is used. The cache manager evicts the cache unit with the highest score when a function such as function (9) is used.

According to one embodiment, the cache manager may also score cache units using more complex functions, such as, for example, non-linear functions that are based on time thresholds. By way of example, the time threshold may be set to 24 hours. In such an example, the complex non-linear function may score a cache unit which has been accessed within the last 24 hours to indicate that it is relevant, notwithstanding the fact its other metadata would normally indicate the cache unit is irrelevant. Such a scoring function may be based on multiple time thresholds, wherein the score decays faster after each successive time threshold.

Figure 5A:
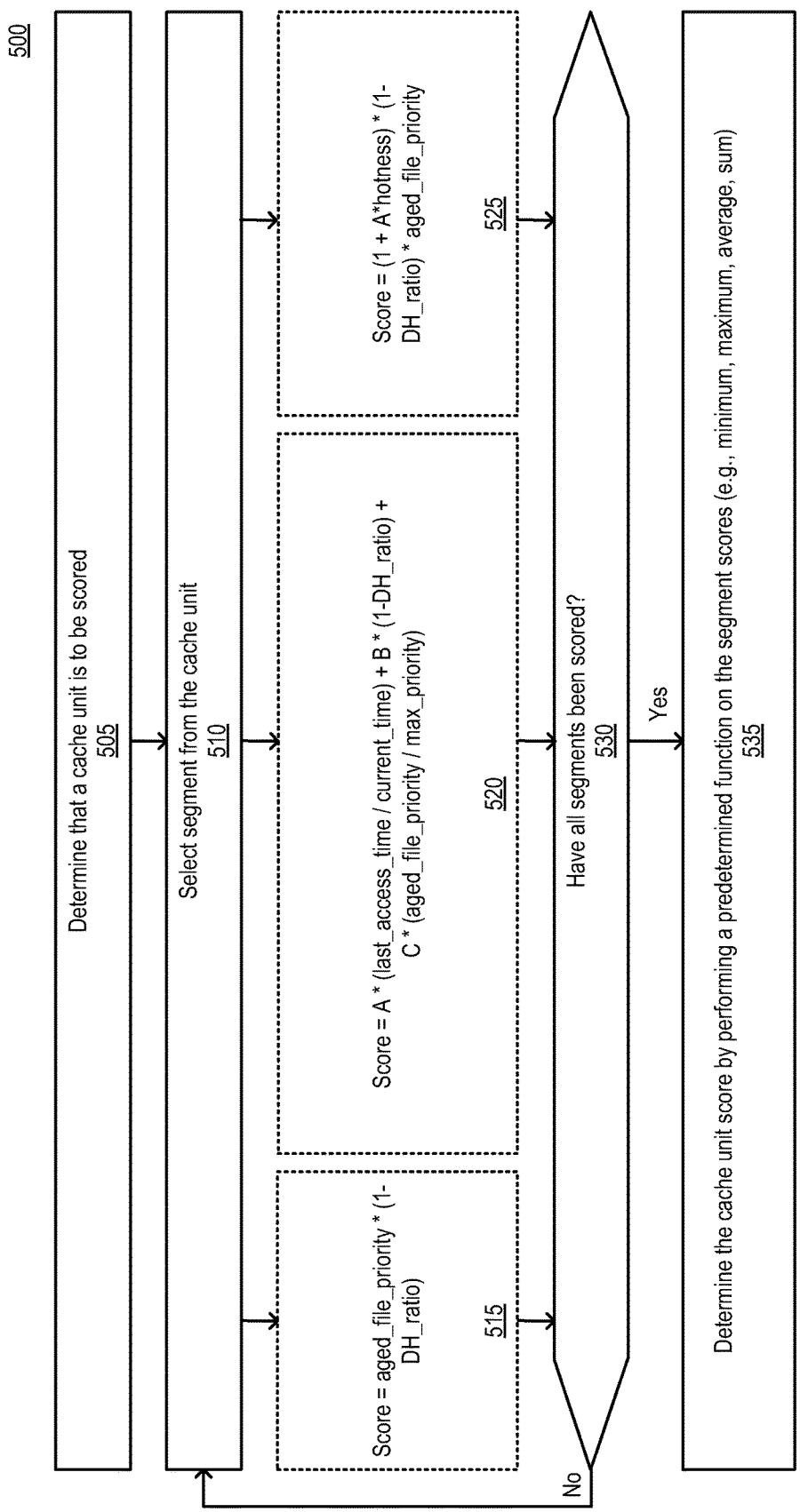
FIG. 5A is a flow diagram illustrating a method for scoring cache units at a segment granularity according to another embodiment.
Figure 5B:
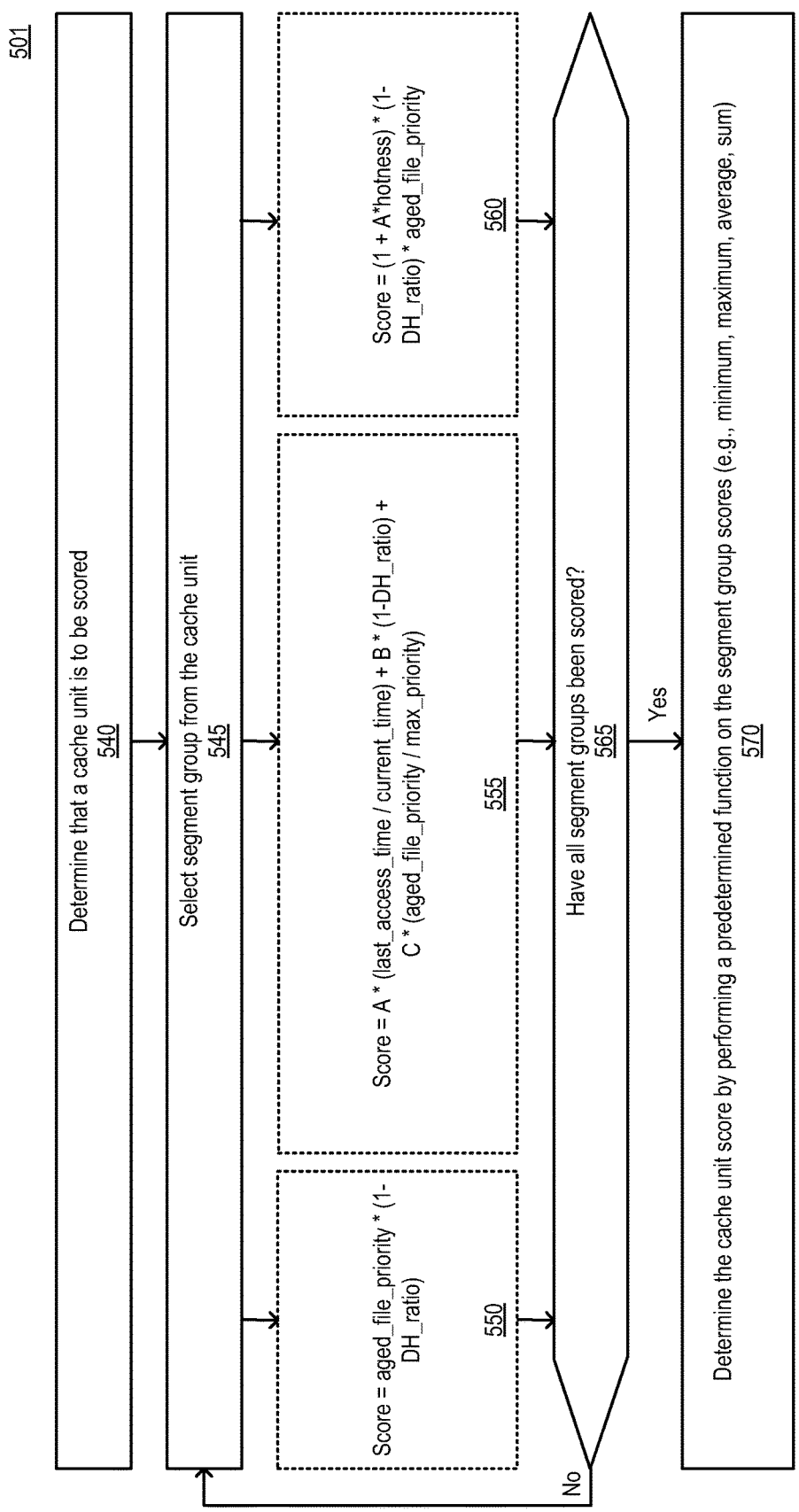
FIG. 5B is a flow diagram illustrating a method for scoring cache units at a segment group granularity according to another embodiment.
Figure 5C:
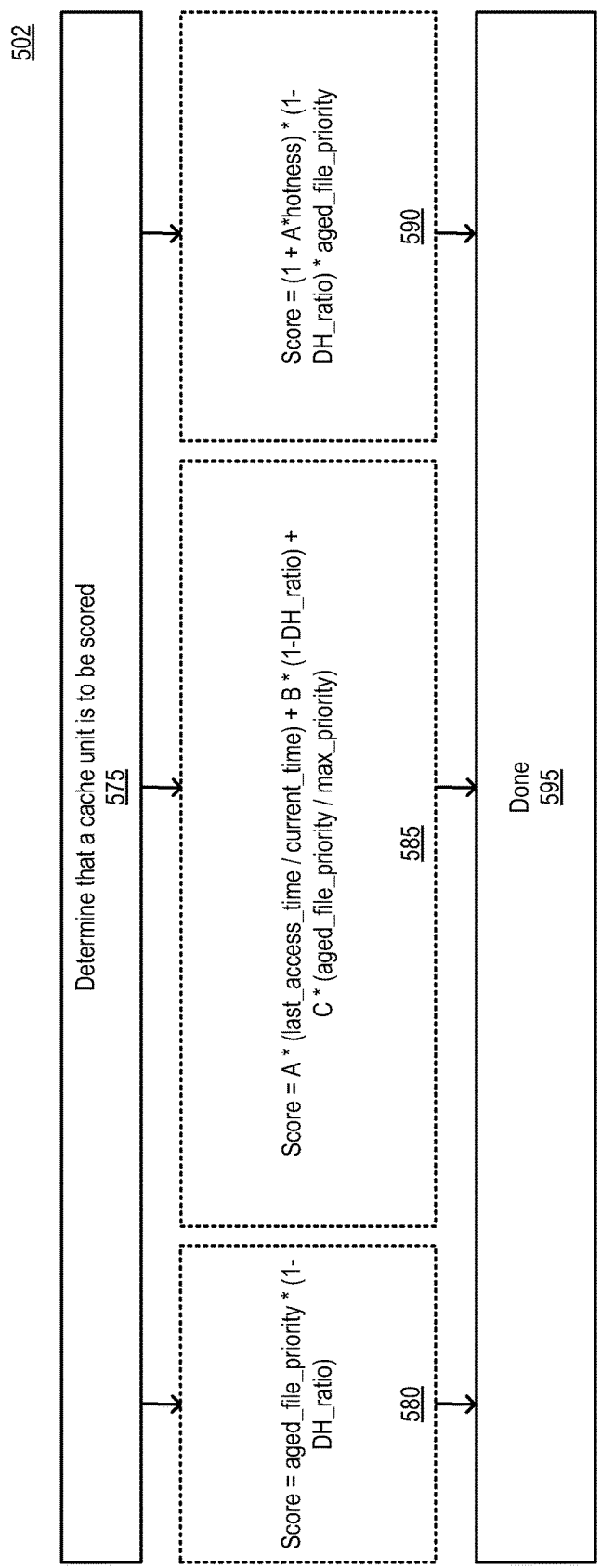
FIG. 5C is a flow diagram illustrating a method for scoring cache units at a cache unit granularity according to another embodiment.

FIGS. 5A-5C are flow diagrams illustrating methods for scoring cache units according to one embodiment. For example, methods 500-502 can be performed by cache manager 115, which can be implemented in software, firmware, hardware, or any combination thereof. FIG. 5A illustrates a method for scoring cache units at the segment granularity. FIG. 5B illustrates a method for scoring cache units at the segment group granularity. FIG. 5C illustrates a method for scoring cache units at the cache unit granularity.

Referring first to FIG. 5A, at block 505 a cache manager determines that a cache unit is to be scored. At block 510, the cache manager selects a segment from the cache unit. At optional block 515, the cache manager determines the segment score based on a file priority of a file associated with the segment and a deletion hint associated with the segment and/or cache unit. In a particular embodiment, the segment score may be determined by using a function similar to the following function:

$$\text{Score}=\text{aged\_file\_priority}*(1-DH\_\text{ratio}) \quad (10)$$

where aged_file_priority is a function of a file's priority and its age since last access. In one embodiment, the cache manager determines aged_file_priority by using a function similar to the following function:

$$\text{aged\_file\_priority}=1+\text{file\_priority}*(1-\text{file\_age}/\text{max\_file\_age}) \quad (10\text{-}1)$$

where file_priority is the priority of the segment (e.g., as represented by priority 201 of FIG. 2), file_age is the difference between the current time and the time of the most recent access to any segment of the file, and max_file_age is the maximum of all file ages. In another embodiment, the cache manager determines aged_file_priority by using a step function similar to the following step function:

$$\begin{aligned}&\text{aged\_file\_priority}=\text{file\_priority, if}\\&\quad \text{file\_age}<=\text{first\_time file\_priority}*A_1-B_1, \text{ if}\\&\quad \text{file\_age}>\text{first\_time and}<=\text{second\_time}\\&\quad \text{file\_priority}*A_2-B_2, \text{ if file\_age}>\text{second\_time}\\&\quad \text{and}<=\text{third\_time}, \ldots =\text{file\_priority}*A_N-B_N, \text{ if}\\&\quad \text{file\_age}>N^{th}\_\text{time and}<=(N+1)^{th}\_\text{time}, \end{aligned} \quad (10\text{-}2)$$

where $A_i$ and $B_i$ are predetermined constants, first_time is a predetermined first time threshold (e.g., 1 hour), second_time is a predetermined second time threshold (e.g., 6 hours), and so on. It should be understood that function (10-2) can be specified to support any number of steps. Variable DH_ratio is defined as described above with respect to function (1).

At optional block 520, the cache manager determines the segment score by using a function similar to the following function:

$$\text{Score}=A*(\text{last\_access\_time}/\text{current\_time})+B*(1-DH\_\text{ratio})+C*(\text{aged\_file\_priority}/\text{max\_priority}) \quad (11)$$

where A, B, and C are predetermined constants, last_access_time is the time of the most recent access of the segment (e.g., as represented by access time 205 of FIG. 2), current_time is the current time of the system, max_priority is the maximum possible value for priority scores, and where DH_ratio and aged_file_priority are defined as described above with respect to function (10).

At optional block 525, the cache manager determines the segment score based on a file priority of a file associated with the segment, a hotness associated with the segment and/or cache unit, and a deletion hint associated with the segment and/or cache unit. In a particular embodiment, the segment score may be determined by using a function similar to the following function:

$$\text{Score}=(1+A*\text{hotness})*(1-DH\_\text{ratio})*\text{aged\_file\_priority} \quad (12)$$

where hotness is a hotness value of the segment (e.g., as represented by hotness 207 of FIG. 2). A is a predetermined constant value. Variables DH_ratio and aged_file_priority are defined as described above with respect to function (10). It should be noted that by incorporating the constants A, B, and C in the above functions, the cache manager is able to assign different weights to different metadata.

At block 530, the cache manager determines whether all segments of the cache unit have been scored. In response to determining that not all segments have been scored, the cache manager returns back to block 510 to select another segment to be scored. At block 535, in response to determining all segments of the cache unit have been scored, the cache manager determines the cache unit score by performing a predetermined function on all the segment scores. For example, the cache manager may determine the minimum, maximum, average, sum, etc. of the segment scores.

It should be noted that typically the cache manager only performs the operations of either block 515, 520, or 525. In other words, the cache manager scores the segments using one function, not multiple functions. It should be further noted that the cache manager may evict the cache unit with either the highest score or the lowest score, depending on the employed scoring function. For example, the cache manager evicts the cache unit with the lowest score when a function such as function (10), (11), or (12) is used.

Referring now to FIG. 5B, at block 540 a cache manager determines that a cache unit is to be scored. At block 545, the cache manager selects a segment group from the cache unit. At optional block 550, the cache manager determines the segment group score based on a file priority of a file associated with the segment group and a deletion hint associated with the segment group and/or cache unit. In a particular embodiment, the segment group score may be determined by using a function similar to the following function:

$$\text{Score}=\text{aged\_file\_priority}*(1-DH\_\text{ratio}) \quad (13)$$

where aged_file_priority is a function of a file's priority and its age since last access. In one embodiment, the cache manager determines aged_file_priority by using a function similar to the following function:

$$\text{aged\_file\_priority}=\text{file\_priority}*(1-\text{file\_age}/\text{max\_file\_age}) \quad (13\text{-}1)$$

where file_priority is the priority of the segment group (e.g., as represented by priority 201 of FIG. 2), file_age is the difference between the current time and the time of the most recent access to any segment of the file, and max_file_age is the maximum of all file ages. In another embodiment, the cache manager determines aged_file_priority by using a step function similar to the following step function:

$$\begin{aligned}&\text{aged\_file\_priority}=\text{file\_priority, if}\\&\quad \text{file\_age}<=\text{first\_time}=\text{file\_priority}*A_1-B_1, \text{ if}\\&\quad \text{file\_age}>\text{first\_time}\\&\quad \text{and}<=\text{second\_time}=\text{file\_priority}*A_2-B_2, \text{ if}\\&\quad \text{file\_age}>\text{second\_time and}<=\text{third\_}\\&\quad \text{time}, \ldots =\text{file\_priority}*A_N-B_N, \text{ if}\\&\quad \text{file\_age}>N^{th}\_\text{time and}<=(N+1)^{th}\_\text{time}, \end{aligned} \quad (13\text{-}2)$$

where $A_i$ and $B_i$ are predetermined constants, first_time is a predetermined first time threshold (e.g., 1 hour), second- _time is a predetermined second time threshold (e.g., 6 hours), and so on. It should be understood that function (13-2) can be specified to support any number of steps. Variable DH_ratio is defined as described above with respect to function (4).

At optional block 555, the cache manager determines the segment group score by using a function similar to the following function:

$$\text{Score}=A*(\text{last\_access\_time}/\text{current\_time})+B*(1-DH\_\text{ratio})+C*(\text{aged\_file\_priority}/\text{max\_priority}) \quad (14)$$

where A, B, and C are predetermined constants, last_access_time is the time of the most recent access of the segment group (e.g., as represented by access time 205 of FIG. 2), current_time is the current time of the system, max_priority is the maximum possible value for priority scores, and where DH_ratio and aged_file_priority are defined above with respect to function (13).

At optional block 560, the cache manager determines the segment group score by using a function similar to the following function:

$$\text{Score}=(1+A*\text{hotness})*(1-DH\_\text{ratio})*\text{aged\_file\_priority} \quad (15)$$

where hotness is the hotness value of the segment group (e.g., as represented by hotness 207 of FIG. 2). A is a predetermined constant value. Variables DH_ratio and aged_file_priority are defined above with respect to function (13). At block 565, the cache manager determines whether all segment groups of the cache unit have been scored. In response to determining that not all segment groups have been scored, the cache manager returns back to block 545 to select another segment group to be scored. At block 570, in response to determining all segment groups of the cache unit have been scored, the cache manager determines the cache unit score by performing a predetermined function on all the segment group scores. For example, the cache manager may determine the minimum, maximum, average, sum, etc. of the segment group scores.

It should be noted that typically the cache manager only performs the operations of either block 550, 555, or 560. In other words, the cache manager scores the segment groups using one function, not multiple functions. It should be further noted that the cache manager may evict the cache unit with either the highest score or the lowest score, depending on the employed scoring function. For example, the cache manager evicts the cache unit with the lowest score when a function such as function (13), (14), or (15) is used.

Referring now to FIG. 5C, at block 575 a cache manager determines that a cache unit is to be scored. At optional block 580, the cache manager determines the cache unit score by using a function similar to the following function:

$$\text{Score}=\text{aged\_file\_priority}*(1-DH\_\text{ratio}) \quad (16)$$

where aged_file_priority is a function of a file's priority and its age since last access. In one embodiment, the cache manager determines aged_file_priority by using a function similar to the following function:

$$\text{aged\_file\_priority}=\text{file\_priority}*(1-\text{file\_age}/\text{max\_file\_age}) \quad (16\text{-}1)$$

where file_priority is the priority of the cache unit (e.g., as represented by priority 201 of FIG. 2), file_age is the difference between the current time and the time of the most recent access to any segment of the file, and max_file_age is the maximum of all file ages. In another embodiment, the cache manager determines aged_file_priority by using a step function similar to the following step function:

$$\begin{aligned}&\text{aged\_file\_priority}=\text{file\_priority, if}\\&\quad\text{file\_age}<=\text{first\_time}=\text{file\_priority}*A_1-B_1\text{, if}\\&\quad\text{file\_age}>\text{first\_time}\\&\quad\text{and}<=\text{second\_time}=\text{file\_priority}*A_2-B_2\text{, if}\\&\quad\text{file\_age}>\text{second\_time and}<=\text{third\_}\\&\quad\text{time, }\ldots=\text{file\_priority}*A_N-B_N\text{, if}\\&\quad\text{file\_age}>N^{th}\_\text{time and}<=(N+1)^{th}\_\text{time,}\end{aligned} \quad (16\text{-}2)$$

where $A_i$ and $B_i$ are predetermined constants, first_time is a predetermined first time threshold (e.g., 1 hour), second_time is a predetermined second time threshold (e.g., 6 hours), and so on. It should be understood that function (16-2) can be specified to support any number of steps. Variable DH_ratio is defined as described above with respect to function (7).

At optional block 585, the cache manager determines the cache unit score by using a function similar to the following function:

$$\text{Score}=A*(\text{last\_access\_time}/\text{current\_time})+B*(1-DH\_\text{ratio})+C*(\text{aged\_file\_priority}/\text{max\_priority}) \quad (17)$$

where A, B, and C are predetermined constants, last_access_time is the time of the most recent access of the cache unit (e.g., as represented by access time 205 of FIG. 2), current_time is the current time of the system, max_priority is the maximum possible value for priority scores, and where DH_ratio and aged_file_priority are defined above with respect to function (16).

At optional block 590, the cache manager determines the cache unit score based on a file priority of a file associated with the cache unit, a hotness associated with the cache unit, and a deletion hint associated with the cache unit. In a particular embodiment, the cache unit score may be determined by using a function similar to the following function:

$$\text{Score}=(1+A*\text{hotness})*(1-DH\_\text{ratio})*\text{aged\_file\_priority} \quad (18)$$

where hotness is the hotness value of the cache unit (e.g., as represented by hotness 207 of FIG. 2). A is a predetermined constant value. Variables DH_ratio and aged_file_priority are defined above with respect to function (16). At block 595, the method is completed.

It should be noted that typically the cache manager only performs the operations of either block 580, 585, or 590. In other words, the cache manager scores the cache units using one function, not multiple functions. It should be further noted that the cache manager may evict the cache unit with either the highest score or the lowest score, depending on the employed scoring function. For example, the cache manager evicts the cache unit with the lowest score when a function such as function (16), (17), or (18) is used.

Figure 6:
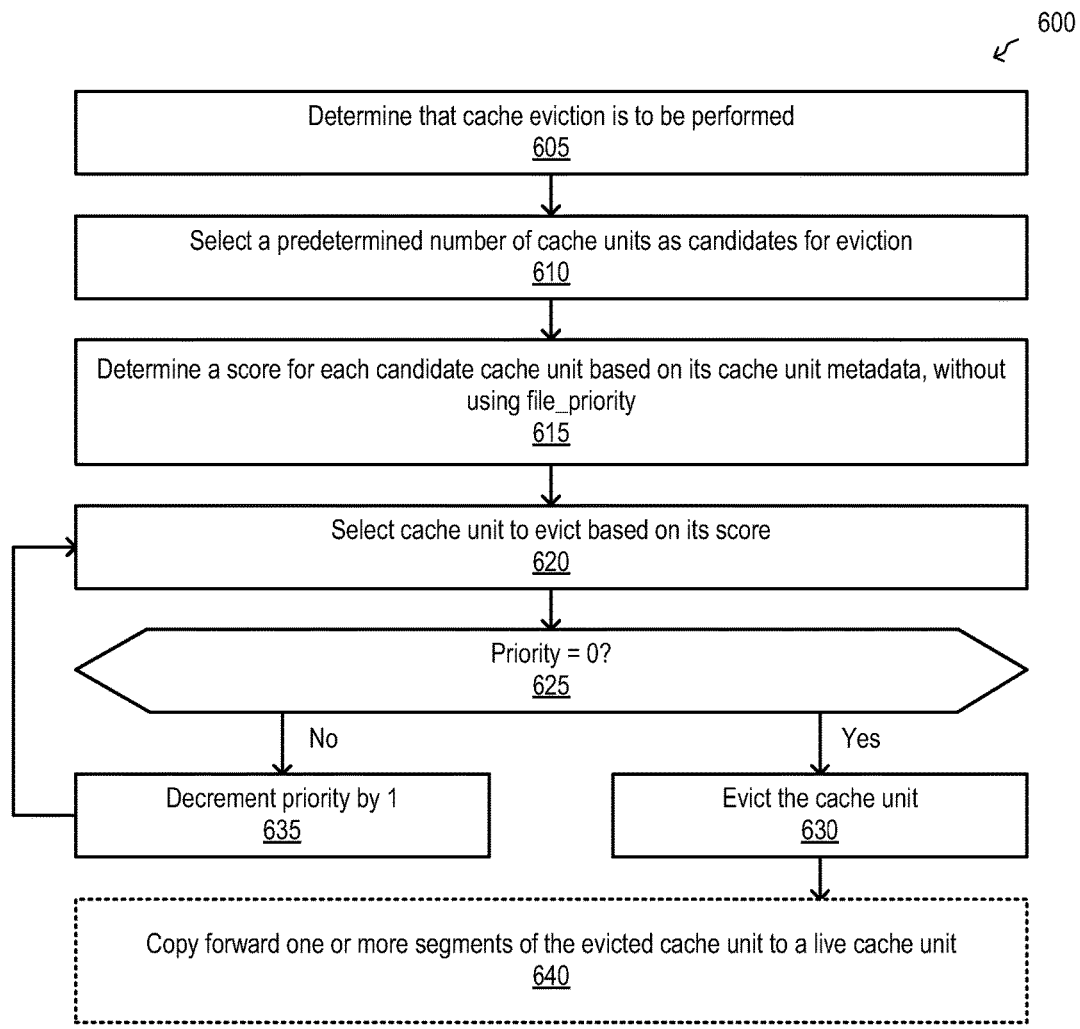
FIG. 6 is a flow diagram illustrating a method for scoring cache units according to one embodiment.

FIG. 6 is a flow diagram illustrating a method for scoring cache units according to one embodiment. For example, method 600 can be performed by cache manager 115, which can be implemented in software, firmware, hardware, or any combination thereof. Referring now to FIG. 6, at block 605 a cache manager determines that a cache eviction is to be performed. At block 610, the cache manager selects a predetermined number of cache units as candidates for cache eviction.

At block 615, the cache manager determines a score for each candidate cache unit based on its cache unit metadata, without using the priority metadata. For example, the cache manager may use a scoring function similar to scoring functions (1) through (9). At block 620, the cache manager selects the candidate cache unit to evict based on its score. For example, cache manager 115 can either select the cache unit with the lowest score or select the cache unit with the highest score, depending on the scoring function that is used.

At block 625, the cache manager determines whether the priority of the selected cache unit is 0. If so, at block 630, the cache manager evicts the selected cache unit. Otherwise, at block 635, the cache manager decrements the priority of the selected cache unit by 1, and returns back to block 620 to select the cache unit with the lowest (or highest) score, which could be the same cache unit as previously selected. At optional block 640, the cache manager copies forward one or more segments of the evicted cache unit to a live cache unit. While this example evicts a single cache unit, it should be understood that the process can be repeated to evict any number of cache units as specified by a client of the cache or to maintain a threshold of space availability in the cache.

Writing data to some storage devices is most efficient when it is in a large granularity, such as a cache unit. That does not mean, however, all segments in a cache unit should be evicted at the same time. For example, there may be a few, very relevant segments in an otherwise irrelevant cache unit. Conventionally, when a cache unit is evicted, all of its segments are evicted, including those which are very relevant. This results in a decrease in the cache hit rate. Embodiments of the present invention overcome such limitations by performing copy forward of relevant segments of an evicted cache unit.

Figure 7:
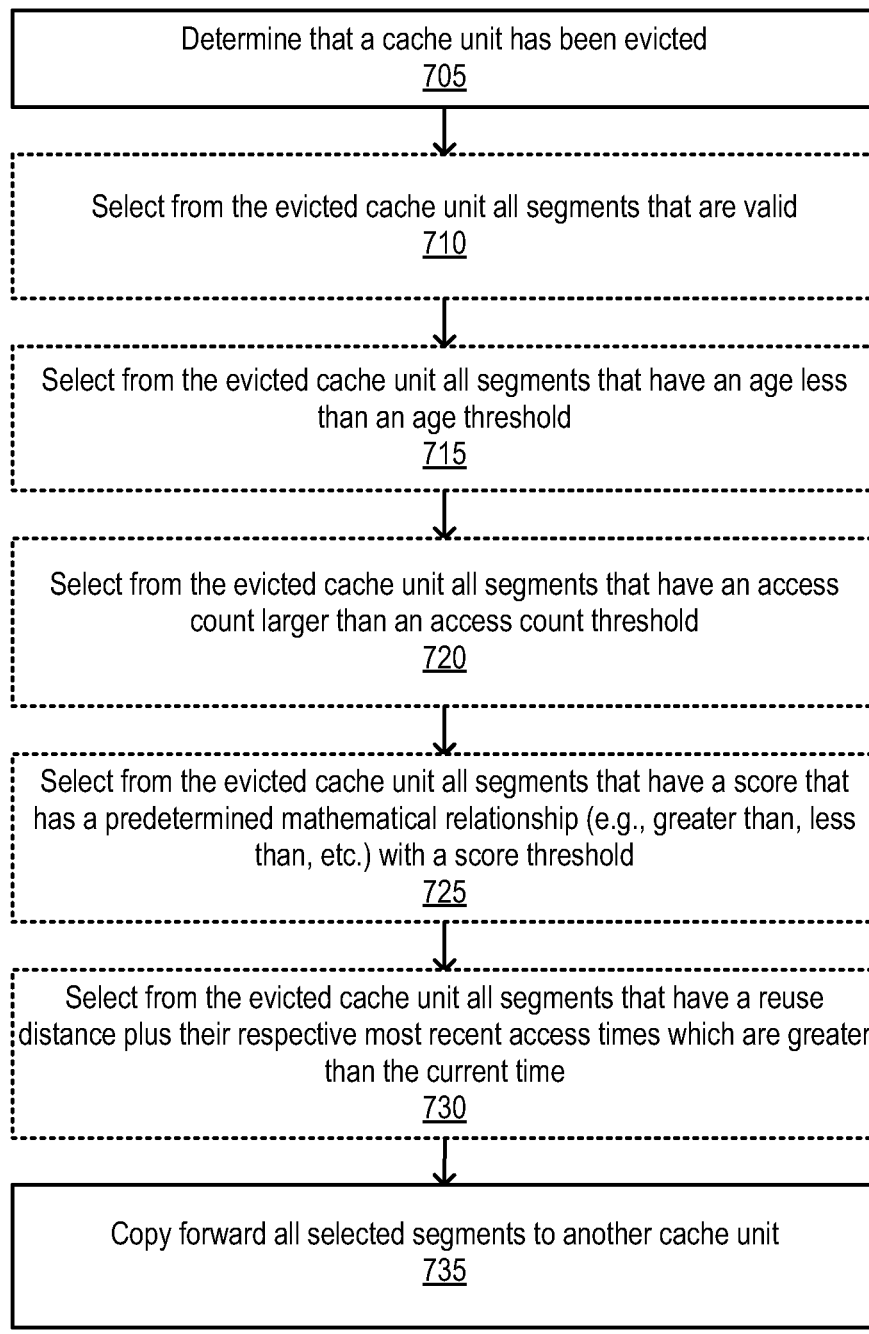
FIG. 7 is a flow diagram illustrating a method for copying forward segments of evicted cache units according to one embodiment.

FIG. 7 is a flow diagram illustrating a method for copying forward segments of an evicted cache unit according to one embodiment. For example, method 700 can be performed by cache manager 115, which can be implemented in software, firmware, hardware, or any combination thereof. Referring now to FIG. 7, at block 705, a cache manager determines that a cache unit has been evicted. At optional block 710, the cache manager selects from the evicted cache unit all segments that are valid. By way of example, in response to determining cache unit 240 of FIG. 2 is being evicted, cache manager 115 may use information contained in DH 204 of FIG. 2 to determine which segments are valid, and select those to be copied forward.

At optional block 715, the cache manager selects from the evicted cache unit all segments that have an age less than a predetermined age threshold. By way of example, in response to determining cache unit 240 of FIG. 2 is being evicted, cache manager 115 may use information contained in access time 205 of FIG. 2 to determine the age of the segments (e.g., by subtracting the timestamps contained in access time 205 from the current time). Cache manager 115 may then select segments which have an age that are less than the predetermined age threshold to be copied forward.

At optional block 720, the cache manager selects from the evicted cache unit all segments that have an access count that is larger than a predetermined access count threshold. By way of example, in response to determining cache unit 240 of FIG. 2 is being evicted, cache manager 115 may use information contained in access count 206 of FIG. 2 to determine the access counts of the segments, and select those which have an access count that is larger than the predetermined access count threshold.

At optional block 725, the cache manager selects from the evicted cache unit all segments that have a score that has a predetermined mathematical relationship (e.g., greater than, less than, etc.) with a predetermined score threshold. By way of example, in response to determining cache unit 240 is being evicted, cache manager 115 may determine the scores of its segments using mechanisms similar to those described above. In one embodiment, the cache manager uses a scoring function which incorporates access time, access count, priority, or any combination thereof. Continuing on with the above example, cache manager 115 may determine the scores of the segments using information contained in access time 205, access count 206, file priority 201, or any combination thereof. In one embodiment, the cache manager may use a scoring function similar to functions (1) through (3) or (10) through (13).

At optional block 730, the cache manager selects from the evicted cache unit all segments whose reuse distance plus their respective most recent access times are greater than the current time. For example, the cache manager determines the reuse distance of a segment by subtracting its second most recent access time from its most recent access time. The cache manager then adds this difference to the most recent access time of the segment, which we refer to as the predicted next access time. If the predicted next access time is greater than the current time, then the cache manager selects the segment to be copied forward because such a segment has a higher likelihood to be reused in the future. In a different embodiment, if the predicted next access time is within a specified threshold of time either before or after the current time, the segment is selected to be copied forward. Other embodiments using reuse distance are possible.

At block 735, the cache manager copies forward all selected segments to another cache unit. In this way, the relevant segments in the evicted cache unit will not be evicted from the cache, and thereby preventing the cache hit rate from being adversely affected.

According to one embodiment, during the copy forward phase, the cache manager groups together related segments. This is desirable so that segments in cache units will tend to age at the same rate. In one such embodiment, the cache manager groups together segments with the same file ID to form new cache units whenever possible, and the file ID will be propagated forward to the newly formed cache units. In an embodiment where a file ID is maintained at the cache unit or segment group level, the file ID will be copied forward when all segments for the new cache unit or segment group, respectively, have the same file ID in their original (i.e., evicted) cache units. This allows a file ID to be used in a future round of copy-forward. Otherwise the cache manager uses the file ID of the majority of segments copied forward into a cache unit as the file ID for the cache unit. In another embodiment, if the segments copied forward have different file IDs, then the cache manager clears the file ID field in the new cache unit or segment group (e.g., by writing a null value to the respective file ID field).

Figure 8A:
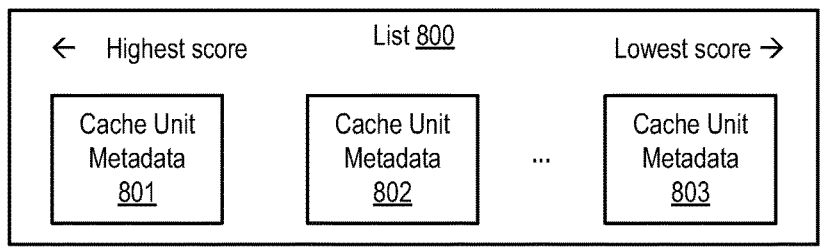
FIG. 8A is a block diagram illustrating a list of cache unit metadata used for performing deferred scoring according to one embodiment.
Figure 8B:
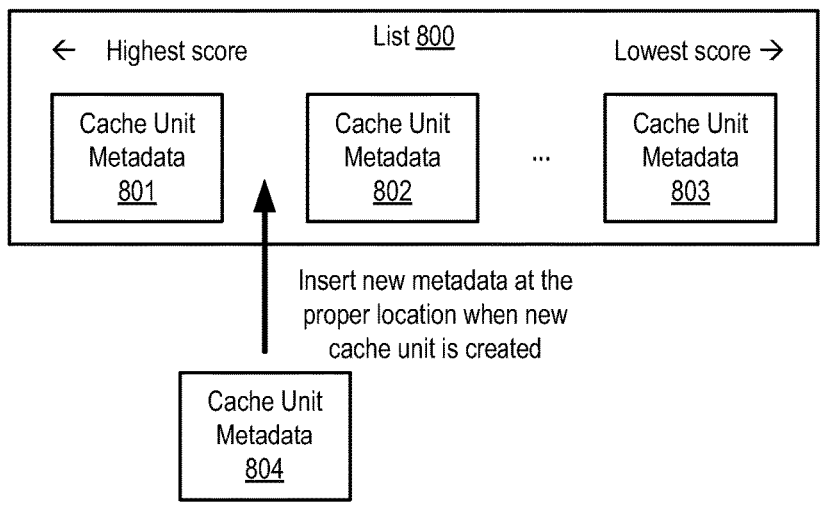
FIG. 8B is a block diagram illustrating an example of inserting new cache unit metadata in a list according to one embodiment.
Figure 8C:
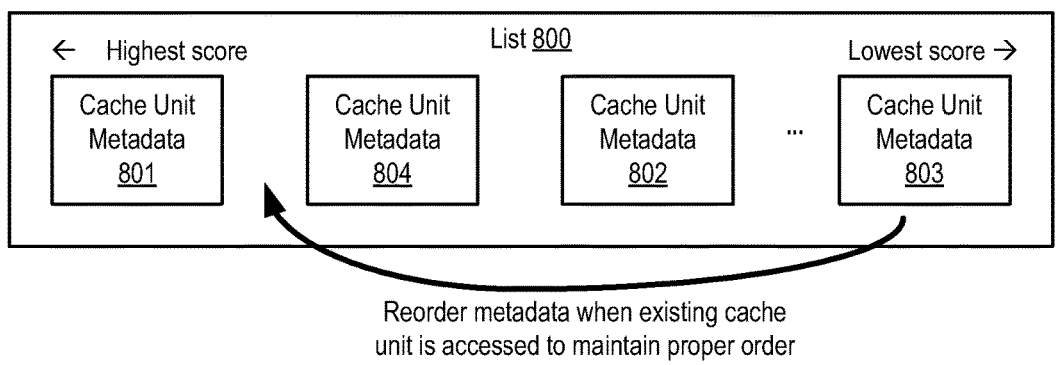
FIG. 8C is a block diagram illustrating an example of repositioning cache unit metadata in a list according to one embodiment.

FIGS. 8A-8C are block diagrams illustrating a list of cache unit metadata maintained and used by cache manager 115 for performing deferred scoring of cache units according to one embodiment. Referring first to FIG. 8A, cache manager 115 maintains list 800 comprising a plurality of cache unit metadata. Each cache unit metadata in list 800 corresponds to a cache unit in cache device 114. List 800 can be a tree, heap, or any other representation. According to one embodiment, cache manager 115 maintains list 800 by determining a score for each of the cache units based on its respective cache unit metadata, using scoring mechanisms similar to those described above. Cache manager 115 then orders the cache unit metadata in list 800 from highest score to lowest score. In the illustrated example, the cache unit metadata are arranged in ascending score from right to left in list 800. In one embodiment, if there are consecutive accesses and/or DH updates to a cache unit, cache manager 115 is configured to "batch" the changes (e.g., by buffering the consecutive accesses and/or DH updates) until the accesses switch to a different cache unit, at which point cache manager 115 is to update the position of the cache unit in the list by calculating the cache unit's score based on the buffered accesses and/or updates.

According to one embodiment, in maintaining list 800, cache manager 115 uses a scoring function that includes a component based on time, and thus, the score for a cache unit changes as time moves forward. In such an embodiment, as time moves forward, even though the scores of the cache unit metadata change, they are still in the correct relative position within list 800. Thus, cache manager 115 is not required to re-compute the score of each cache unit every time an eviction process is to be performed. Instead, cache manager 115 is only required to compute the score when it is time to insert a new cache unit metadata or reposition an existing cache unit metadata in list 800. An insertion may be caused by the creation of a new cache unit in cache device 114. A reposition may be caused by the access of an existing cache unit in cache device 114. Accordingly, cache manager 115 reduces the computational overhead by maintaining list 800, which enables cache manager 115 to avoid re-computation of scores for all cache units for each cache eviction process.

Referring now to FIG. 8B, which illustrates an example of inserting a new cache unit metadata in list 800. When a new cache unit is created in cache device 114, its cache unit metadata needs to be inserted in list 800. In this example, a cache unit corresponding to cache unit metadata 804 has been created in cache device 114, and thus, cache unit metadata 804 needs to be inserted in list 800. In one embodiment, cache manager 115 determines the score of the new cache unit metadata. Cache manager 115 then determines a location in list 800 to insert the new cache unit metadata such that the order of scores is preserved (e.g., the scores of the cache unit metadata in list 800 continue to ascend from lowest to highest).

In one embodiment, cache manager 115 determines the location in list 800 to insert a new cache unit metadata by using a search algorithm such as the binary search algorithm. For example, cache manager 115 uses the search algorithm to identify candidate locations where the new cache unit metadata may be inserted. For each identified candidate location, cache manager 115 determines whether the new cache unit metadata should be inserted there based on the score of the new cache unit metadata and the scores of the cache unit metadata at the identified location calculated at the current time. The search continues until a proper location is identified.

In this example, the search algorithm identifies the location in list 800 that is between cache unit metadata 801 and 802. Accordingly, cache manager 115 determines their scores based on their respective metadata and the current time. Note here that their metadata need not be updated in list 800. Cache manager 115 determines that the score of cache unit metadata 804 is greater than or equal to the score of cache unit metadata 802, and less than or equal to the score of cache unit metadata 801. As a result, cache manager 115 inserts cache unit metadata 804 between cache unit metadata 801 and 802. It should be noted that by using such a mechanism, cache manager 115 is only required to re-calculate scores for cache unit metadata which are located at positions which are identified by the search algorithm. Cache manager 115 is not required to re-calculate scores for cache unit metadata which reside at locations that are not identified by the search algorithm. As a result, the computational overhead is reduced. For example, if list 800 is organized in a tree with N cache unit metadata, with depth O(Log(N)), then only O(Log(N)) calculations are needed to position the new cache unit metadata in the correct location.

Referring now to FIG. 8C, which illustrates an example of repositioning a cache unit metadata in list 800. When a cache unit is accessed in cache device 114, its cache unit metadata needs to be repositioned in list 800. In one embodiment, cache manager 115 determines the score of the accessed cache unit metadata. Cache manager 115 then determines a location in list 800 to reposition the cache unit metadata such that the order of scores is preserved, by using mechanisms similar to those described above with respect to cache unit metadata insertion. In this example, a cache unit was accessed, and its corresponding cache unit metadata 803 needs to be repositioned. Using the above mechanisms, cache manager 115 determines that cache unit metadata 803 needs to be repositioned between cache unit metadata 801 and 804. Again, cache manager 115 does not re-calculate scores for unaffected cache unit metadata (e.g., cache unit metadata that are not at locations identified by the search algorithm).

Figure 9:
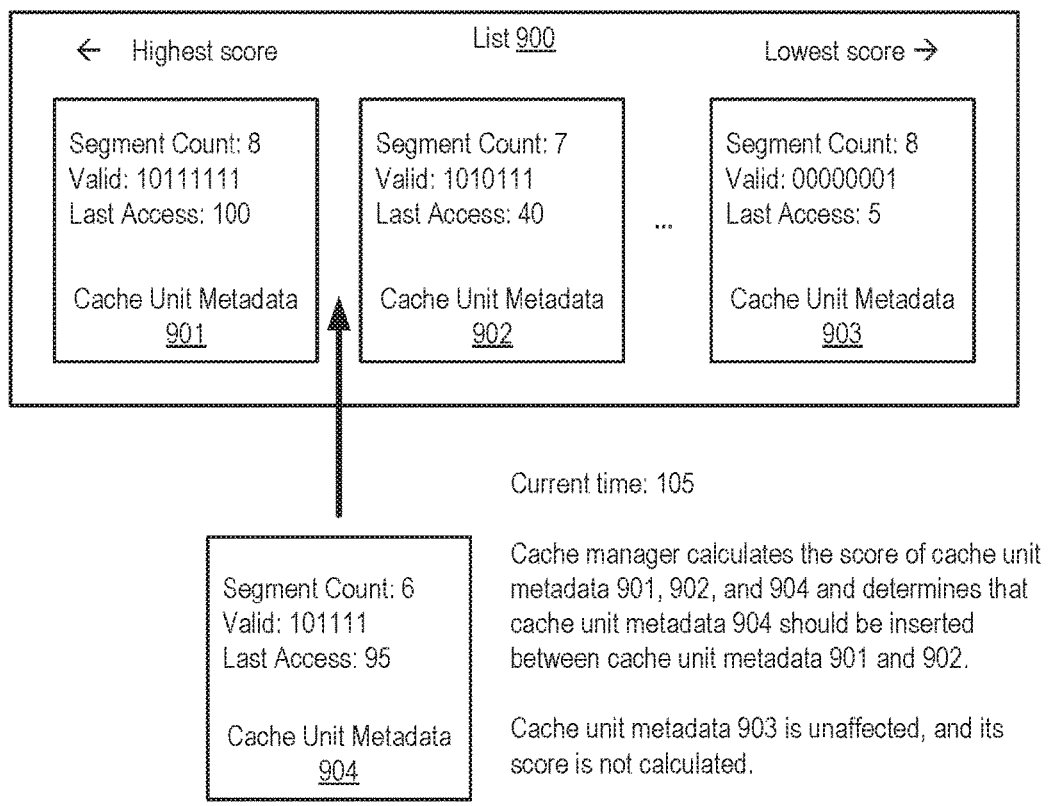
FIG. 9 is a block diagram illustrating a list of cache unit metadata used for performing deferred scoring according to one embodiment.

FIG. 9 is a block diagram illustrating a list of cache unit metadata maintained and used by cache manager 115 for performing deferred scoring of cache units according to one embodiment. In this example, the relevant metadata used for calculating scores are segment count, segment validity, and last access time. Prior to insertion, list 900 comprises cache unit metadata 901-903. Subsequently, a cache unit is created in cache device 114, and thus its corresponding cache unit metadata 904 needs to be inserted into list 900.

Cache unit manager 115 determines the score of cache unit metadata 904. Further, cache manager 115 uses a search algorithm (e.g., binary search) to search for a proper location to insert cache unit metadata 904. Based on the result of the search, cache manager 115 determines the score for cache unit metadata 901 and 902 based on their respective metadata and the current time. In this example, cache manager 115 determines that the score of cache unit metadata 904 is greater than or equal to the score of cache unit metadata 902, and less than or equal to the score of cache unit metadata 901. Accordingly, cache manager 115 inserts cache unit metadata 904 between cache unit metadata 901-902. It should be noted that cache unit metadata 903 is unaffected, and cache manager 115 does not calculate its score during the insertion process.

Figure 10A:
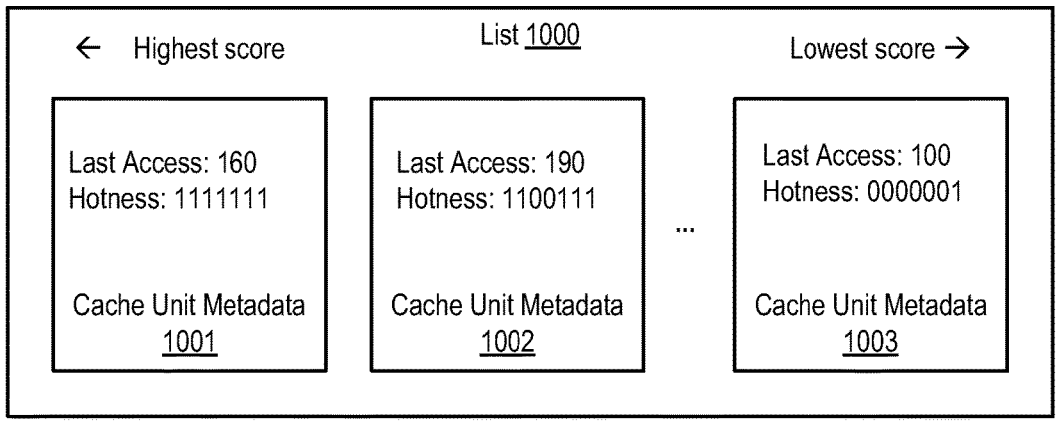
FIG. 10A is a block diagram illustrating a list of cache unit metadata used for performing deferred scoring according to one embodiment.
Figure 10B:
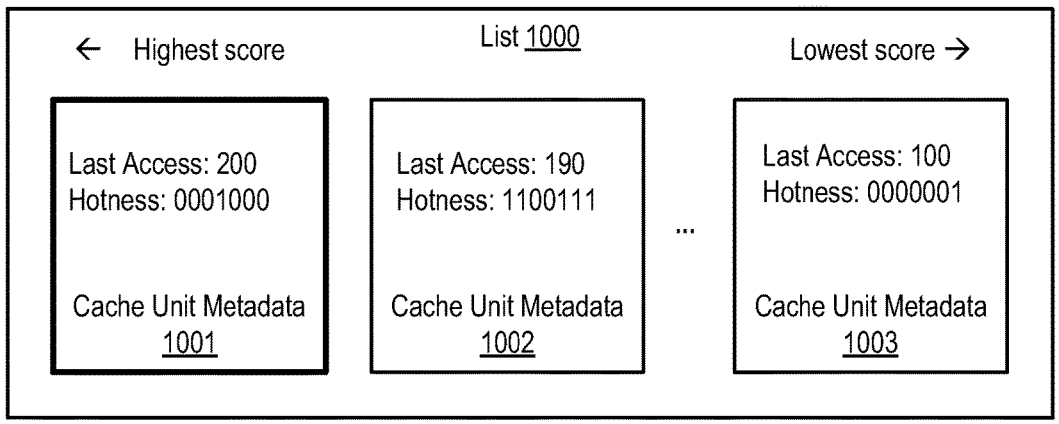
FIG. 10B is a block diagram illustrating a list of cache unit metadata used for performing deferred scoring according to one embodiment.

FIGS. 10A-10B are block diagrams illustrating a list of cache unit metadata maintained and used by cache manager 115 for performing deferred scoring of cache units according to one embodiment. In this example, the relevant metadata used for calculating scores are last access time and hotness. Referring first to FIG. 10A, prior to insertion, list 1000 comprises cache unit metadata 1001-1003. Subsequently, a cache unit is accessed in cache device 114, and thus its corresponding cache unit metadata 1001 needs to be repositioned.

In this example, a "0" value is right shifted once for every 10 seconds since the last access to the corresponding cache unit. As illustrated in FIG. 10A, the cache unit corresponding to cache unit metadata 1001 was last accessed at time 160 seconds, and its hotness has a value in binary of "1111111". Referring now to FIG. 10B, the cache unit corresponding to cache unit metadata 1001 was accessed at time 200 seconds. It has been 40 seconds since it was last accessed. Accordingly, its hotness register is right shifted 4 times with a "0" value, resulting in a hotness value in binary of "0000111". Because of the access, its hotness is incremented by 1 resulting in the value "0001000".

Cache unit manager 115 then determines the score of cache unit metadata 1001 based on its updated metadata. Further, cache manager 115 uses a search algorithm (e.g., binary search) to search for a proper location to reposition cache unit metadata 1001. Based on the result of the search, cache manager 115 determines the score for cache unit metadata 1002 based on its metadata and the current time. In this example, cache manager 115 determines that the score of cache unit metadata 1001 is greater than the score of cache unit metadata 1002. Accordingly, cache manager 115 inserts cache unit metadata 1001 before cache unit metadata 1002 (i.e., there is no change to list 1000). It should be noted that cache unit metadata 1003 is unaffected, and cache manager 115 does not recalculate its score during the reposition process.

Figure 11:
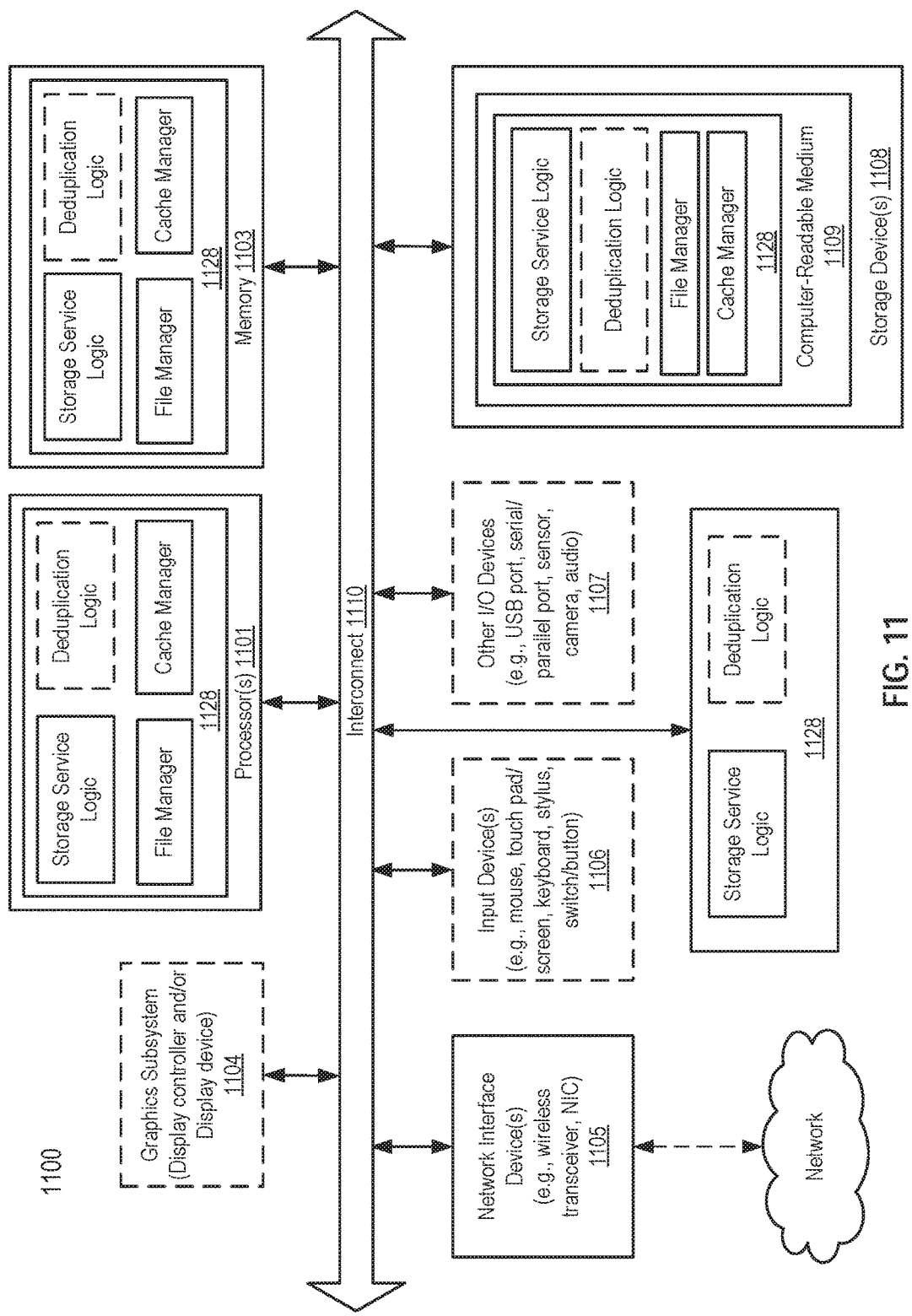
FIG. 11 is a block diagram illustrating a data processing system according to one embodiment.

FIG. 11 is a block diagram illustrating an example of a data processing system which may be used with one embodiment of the invention. For example, system 1100 may represent any of data processing systems described above performing any of the processes or methods described above. System 1100 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1100 is intended to show a high level view of many components of the computer system. However, it is to be understood that additional components may be present in certain implementations and furthermore, different arrangement of the components shown may occur in other implementations. System 1100 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1100 includes processor 1101, memory 1103, and devices 1105-1108 via a bus or an interconnect 1110. Processor 1101 may represent a single processor or multiple processors with a single processor core or multiple processor cores included therein. Processor 1101 may represent one or more general-purpose processors such as a microprocessor, a central processing unit (CPU), or the like. More particularly, processor 1101 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1101 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1101, which may be a low power multi-core processor such as an ultra-low voltage processor, may act as a main processing unit and central hub for communication with the various components of the system. Such processor can be implemented as a system on chip (SoC). Processor 1101 is configured to execute instructions for performing the operations and steps discussed herein. System 1100 may further include a graphics interface that communicates with optional graphics subsystem 1104, which may include a display controller, a graphics processor, and/or a display device.

Processor 1101 may communicate with memory 1103, which in one embodiment can be implemented via multiple memory devices to provide for a given amount of system memory. Memory 1103 may include one or more volatile storage (or memory) devices such as random access memory (RAM), dynamic RAM (DRAM), synchronous DRAM (SDRAM), static RAM (SRAM), or other types of storage devices. Memory 1103 may store information including sequences of instructions that are executed by processor 1101, or any other device. For example, executable code and/or data of a variety of operating systems, device drivers, firmware (e.g., basic input output system or BIOS), and/or applications can be loaded in memory 1103 and executed by processor 1101. An operating system can be any kind of operating system, such as, for example, Windows® operating system from Microsoft®, Mac OS/iOS from Apple®, Android® from Google®, Linux®, Unix®, or other real-time or embedded operating systems such as VxWorks®.

System 1100 may further include IO devices such as devices 1105-1108, including network interface device(s) 1105, optional input device(s) 1106, and other optional IO device(s) 1107. Network interface device 1105 may include a wireless transceiver and/or a network interface card (NIC). The wireless transceiver may be a WiFi transceiver, an infrared transceiver, a Bluetooth® transceiver, a WIMAX (WiMax) transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1106 may include a mouse, a touch pad, a touch sensitive screen (which may be integrated with a display device of graphics subsystem 1104), a pointer device such as a stylus, and/or a keyboard (e.g., physical keyboard or a virtual keyboard displayed as part of a touch sensitive screen). For example, input device 1106 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1107 may include an audio device. An audio device may include a speaker and/or a microphone to facilitate voice-enabled functions, such as voice recognition, voice replication, digital recording, and/or telephony functions. Other IO devices 1107 may further include universal serial bus (USB) port(s), parallel port(s), serial port(s), a printer, a network interface, a bus bridge (e.g., a peripheral component interconnect (PCI)-PCI bridge), sensor(s) (e.g., a motion sensor such as an accelerometer, gyroscope, a magnetometer, a light sensor, compass, a proximity sensor, etc.), or a combination thereof. Devices 1107 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Certain sensors may be coupled to interconnect 1110 via a sensor hub (not shown), while other devices such as a keyboard or thermal sensor may be controlled by an embedded controller (not shown), dependent upon the specific configuration or design of system 1100.

To provide for persistent storage of information such as data, applications, one or more operating systems and so forth, a mass storage (not shown) may also couple to processor 1101. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1101, e.g., via a serial peripheral interface (SPI). This flash device may provide for non-volatile storage of system software, including BIOS software as well as other firmware of the system.

Storage device 1108 may include computer-accessible storage medium 1109 (also known as a machine-readable storage medium or a computer-readable medium) on which is stored one or more sets of instructions or software (e.g., module, unit, and/or logic 1128) embodying any one or more of the methodologies or functions described herein. Module/unit/logic 1128 may also reside, completely or at least partially, within memory 1103 and/or within processor 1101 during execution thereof by data processing system 1100, memory 1103 and processor 1101 also constituting machine-accessible storage media. Module/unit/logic 1128 may further be transmitted or received over a network via network interface device 1105.

Computer-readable storage medium 1109 may also be used to store the some software functionalities described above persistently. While computer-readable storage medium 1109 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1128, components and other features described herein can be implemented as discrete hardware components or integrated in the functionality of hardware components such as ASICS, FPGAs, DSPs or similar devices. In addition, module/unit/logic 1128 can be implemented as firmware or functional circuitry within hardware devices. Further, module/unit/logic 1128 can be implemented in any combination hardware devices and software components.

Note that while system 1100 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such operations may be performed by a computer program stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, the method comprising:

maintaining a metadata set for each cache unit of a cache device, wherein the cache device comprises a plurality of cache units, each cache unit having a plurality of segments, wherein each metadata set includes deletion hints (DH) metadata indicating whether each of the plurality of segments of a corresponding cache unit is valid or deprecated, wherein each of the plurality of segments can chance from being valid to being deprecated, wherein each deprecated segment can change back to being valid;

in response to determining that a cache eviction is to be performed:
selecting a predetermined number of cache units from the plurality of cache units, and
determining a score for each of the selected cache units based on the DH metadata of the respective metadata set; and evicting one or more of the selected predetermined number of cache units based on their respective scores.

2. The method of claim 1, wherein maintaining the metadata set for each cache unit of the cache device comprises:
receiving DHs of a set of one or more segments from a cache client;
identifying one or more cache units that contain one or more segments of the set of one or more segments; and
updating the DH metadata of the identified one or more cache units.

3. The method of claim 1, wherein maintaining the metadata set for each cache unit of the cache device comprises maintaining the NI metadata of each metadata set at a segment granularity.

4. The method of claim 1, wherein maintaining the metadata set for each cache unit of the cache device comprises maintaining the NI metadata of each metadata set at a segment group granularity.

5. The method of claim 1, wherein maintaining the metadata set for each cache unit of the cache device comprises maintaining the NI metadata of each metadata set at a cache unit granularity.

6. The method of claim 1, wherein maintaining the metadata set for each cache unit of the cache device comprises maintaining a bit map, wherein each bit of the bit map indicates a DH of a segment.

7. The method of claim 1, wherein maintaining the metadata set for each cache unit of the cache device comprises maintaining a validation count for each segment group, wherein each validation count indicates a total number of valid segments in a respective segment group.

8. The method of claim 1, wherein maintaining the metadata set for each cache unit of the cache device comprises maintaining a validation count for each cache unit, wherein each validation count indicates a total number of valid segments in a respective cache unit.

9. The method of claim 1, wherein the method further comprises:
determining a probability of a deprecated segment changing back to being valid; and
determining the score for each cache unit of the selected predetermined number of cache units further based on the determined probability.

10. The method of claim 9, wherein the probability of a deprecated segment changing back to being valid is calculated at a sub-cache granularity, wherein the sub-cache granularity is one of per file, folder, or volume, and wherein the calculated probability for a particular granularity is used in determining the score for the corresponding cache unit.

11. The method of claim 1, further comprising:
copying one or more valid segments of the evicted one or more cache units to one or more other cache units.

12. A non-transitory computer-readable storage medium having computer code stored therein, which when executed by a processor, causes the processor to perform operations comprising:
maintaining a metadata set for each cache unit of a cache device, wherein the cache device comprises a plurality of cache units, each cache unit having a plurality of segments, wherein each metadata set includes deletion hints (DH) metadata indicating whether each of the plurality of segments of a corresponding cache unit is valid or deprecated, wherein each of the plurality of segments can change from being valid to being deprecated, wherein each deprecated segment can change back to being valid;

in response to determining that a cache eviction is to be performed:
selecting a predetermined number of cache units from the plurality of cache units, and
determining a score for each of the selected cache units based on the DH metadata of the respective metadata set; and evicting one or more of the selected predetermined number of cache units based on their respective scores.

13. The non-transitory computer-readable storage medium of claim 12, wherein maintaining the metadata set for each cache unit of the cache device comprises:
receiving DHs of a set of one or more segments from a cache client;
identifying one or more cache units that contain one or more segments of the set of one or more segments; and
updating the DH metadata of the identified one or more cache units.

14. The non-transitory computer-readable storage medium of claim 12, wherein maintaining the metadata set for each cache unit of the cache device comprises maintaining the DH metadata of each metadata set at a segment granularity.

15. The non-transitory computer-readable storage medium of claim 12, wherein maintaining the metadata set for each cache unit of the cache device comprises maintaining the DH metadata of each metadata set at a segment group granularity.

16. The non-transitory computer-readable storage medium of claim 12, wherein maintaining the metadata set for each cache unit of the cache device comprises maintaining the DH metadata of each metadata set at a cache unit granularity.

17. The non-transitory computer-readable storage medium of claim 12, wherein maintaining the metadata set for each cache unit of the cache device comprises maintaining a bit map, wherein each bit of the bit map indicates a DH of a segment.

18. The non-transitory computer-readable storage medium of claim 12, wherein maintaining the metadata set for each cache unit of the cache device comprises maintaining a validation count for each segment group, wherein each validation count indicates a total number of valid segments in a respective segment group.

19. The non-transitory computer-readable storage medium of claim 12, wherein maintaining the metadata set for each cache unit of the cache device comprises maintaining a validation count for each cache unit, wherein each validation count indicates a total number of valid segments in a respective cache unit.

20. The non-transitory computer-readable storage medium of claim 12, wherein the operations further comprise:
- determining a probability of a deprecated segment changing back to being valid; and
- determining the score for each cache unit of the selected predetermined number of cache units further based on the determined probability.

21. The non-transitory computer-readable storage medium of claim 20, wherein the probability of a deprecated segment changing back to being valid is calculated at a sub-cache granularity, wherein the sub-cache granularity is one of per file, folder, or volume, and wherein the calculated probability for a particular granularity is used in determining the score for the corresponding cache unit.

22. The non-transitory computer-readable storage medium of claim 12, further comprising:
- copying one or more valid segments of the evicted one or more cache units to one or more other cache units.

23. A data processing system, comprising:
- a cache device comprising a plurality of cache units, each cache unit having a plurality of segments;
- a set of one or more processors; and
- a non-transitory machine-readable storage medium having instructions stored therein which, when executed by the set of one or more processors, causes the set of one or more processors to
    - maintain a metadata set for each cache unit of the cache device, wherein each metadata set includes deletion hints (DH) metadata indicating whether each of the plurality of segments of a corresponding cache unit is valid or deprecated, wherein each of the plurality of segments can change from being valid to being deprecated, wherein each deprecated segment can change back to being valid;
    - in response to determining that a cache eviction is to be performed:
        - select a predetermined number of cache units from the plurality of cache units, and
        - determine a score for each of the selected cache units based on the DH metadata of the respective metadata set; and
    - evict one or more of the selected predetermined number of cache units based on their respective scores.

24. The data processing system of claim 23, wherein maintaining the metadata set for each cache unit of the cache device comprises:
- receiving DHs of a set of one or more segments a cache client;
- identifying one or more cache units that contain one or more segments of the set of one or more segments; and
- updating the DH metadata of the identified one or more cache units.

25. The data processing system of claim 23, wherein maintaining the metadata set for each cache unit of the cache device comprises maintaining the DH metadata of each metadata set at a segment granularity.

26. The data processing system of claim 23, wherein maintaining the metadata set for each cache unit of the cache device comprises maintaining the DH metadata of each metadata set at a segment group granularity.

27. The data processing system of claim 23, wherein maintaining the metadata set for each cache unit of the cache device comprises maintaining the DH metadata of each metadata set at a cache unit granularity.

28. The data processing system of claim 23, wherein maintaining the metadata set for each cache unit of the cache device comprises maintaining a bit map, wherein each bit of the bit map indicates a DH of a segment.

29. The data processing system of claim 23, wherein maintaining the metadata set for each cache unit of the cache device comprises maintaining a validation count for each segment group, wherein each validation count indicates a total number of valid segments in a respective segment group.

30. The data processing system of claim 23, wherein maintaining the metadata set for each cache unit of the cache device comprises maintaining a validation count for each cache unit, wherein each validation count indicates a total number of valid segments in a respective cache unit.

31. The data processing system of claim 23, the non-transitory machine readable storage medium further contains code which, when executed by the set of one or more processors, causes the set of one or more processors to:
- determine a probability of a deprecated segment changing back to being valid; and
- determine the score for each cache unit of the selected predetermined number of cache units further based on the determined probability.

32. The data processing system of claim 31, wherein the probability of a deprecated segment changing back to being valid is calculated at a sub-cache granularity, wherein the sub-cache granularity is one of per file, folder, or volume, and wherein the calculated probability for a particular granularity is used in determining the score for the corresponding cache unit.

33. The data processing system of claim 23, wherein the non-transitory machine readable storage medium further contains code which, when executed by the set of one or more processors, causes the set of one or more processors to:
- copy one or more valid segments of the evicted one or more cache units to one or more other cache units.

\* \* \* \* \*